US005685931A

United States Patent [19]

Kakamu et al.

[11] Patent Number: 5,685,931

[45] Date of Patent: Nov. 11, 1997

[54] METHOD OF MANUFACTURING AN ACCESSORY TILE

[75] Inventors: Yoshinori Kakamu; Shinichi Kakamu; Shukichi Kakamu, all of Toki, Japan

[73] Assignee: Mino Ganryo Kagaku Corporation, Tokyo, Japan

[21] Appl. No.: 493,266

[22] Filed: Jun. 21, 1995

[30] Foreign Application Priority Data

Jun. 21, 1994 [JP] Japan .................................... 6-139183

[51] Int. Cl.$^{6}$ ........................... B32B 31/20; B32B 31/06; C04B 37/00

[52] U.S. Cl. ..................... 156/89; 156/304.2; 156/304.5; 156/304.6; 264/632; 264/667; 264/680; 264/DIG. 31

[58] Field of Search ............................ 156/63, 89, 304.6, 156/304.3, 304.5, 304.2; 264/56, 239, 241, 245, 248, 249, 261, 263, DIG. 31, DIG. 76, 679, 680, 667, 632

[56] References Cited

U.S. PATENT DOCUMENTS

| | | | |
|---|---|---|---|
| 957,187 | 5/1910 | Chappell . | |
| 1,539,148 | 5/1925 | Sylvester . | |
| 2,007,961 | 7/1935 | Bolton | 25/42 |
| 2,794,940 | 6/1957 | Roup | 317/101 |
| 4,759,965 | 7/1988 | Kato et al. | 428/138 |
| 5,190,708 | 3/1993 | Vitaliano et al. | 264/62 |

FOREIGN PATENT DOCUMENTS

| | | |
|---|---|---|
| 0473383 | 3/1992 | European Pat. Off. . |
| 351874 | 7/1905 | France . |
| 497983 | 12/1919 | France . |
| 658070 | 5/1929 | France . |
| 814339 | 6/1937 | France . |
| 1234462 | 10/1960 | France . |
| 68728 | 6/1893 | Germany . |
| 287358 | 1/1914 | Germany . |
| 282990 | 3/1915 | Germany . |
| 286234 | 7/1915 | Germany . |
| 3203107 | 8/1983 | Germany . |
| 50-116516 | 9/1975 | Japan . |
| 63-252972 | 10/1988 | Japan . |
| 64-11441 | 2/1989 | Japan . |
| 28883 | 2/1990 | Japan . |
| 2239905 | 9/1990 | Japan . |
| 242323 | 9/1990 | Japan . |
| 430011 | 7/1992 | Japan . |
| 430012 | 7/1992 | Japan . |
| 32246 | 10/1954 | Switzerland . |
| 904037 | 8/1962 | United Kingdom . |

*Primary Examiner*—Melvin C. Mayes

*Attorney, Agent, or Firm*—Michaelson & Wallace; Peter L. Michaelson; Jeremiah G. Murray

[57] ABSTRACT

An accessory tile and its manufacturing method. The accessory tile is made of preformed tile bodies of plate shape which have colored patterns on their surfaces, respectively. The preformed tile bodies are disposed on both sides of a press surface of a lower mold of a V-shaped cross section, respectively, while joint end surfaces of the preformed tile bodies are contacted closely with each other. They are pressed between the lower mold and an upper mold into one body. The pressed bodies are burnt to obtain the accessory tile as a final product.

21 Claims, 13 Drawing Sheets

METHOD OF MANUFACTURING AN ACCESSORY TILE

BACKGROUND OF THE INVENTION

1. Field of the Invention

This invention relates to an accessory tile and its manufacturing method, more particularly, to an accessory tile which has a variety of colored patterns on the surfaces and a manufacturing method of such a tile. Such tiles may be angled or curved, and used for stepped parts, e.g. stairs, corners of pavements or roads, corners of gateposts, or any building corner parts.

2. Description of Related Art

Conventionally, accessory tiles have been used for corner tiling. Such tiles have a bent plate shape having an angle corresponding to a corner to be tiled. These tiles are generally manufactured by pressure forming of granulated raw materials. Specifically, the process is as follows. First, a press die composed of a lower mold and an upper mold is used. The molds define a forming space of a V-shaped or reversed V-shaped cross-section corresponding to a cross section of an accessory tile. A granulated raw material containing a binder is disposed on a press surface of the lower mold and pressed between the lower mold and the upper mold, thereby forming a tile body of a specific shape corresponding to a shape of the accessory tile. Then, the tile body is burned. Such an art is disclosed in Japanese Utility Model Publication No. 4-30011 or the like.

Thus manufatured accessory tiles have unified bodies without any Joint lines at anywere including corner portions, so that they present good appearance and sufficient strength. However, the patterns formed on their surfaces are limited to simple ones such as plain-colored or spotted patterns.

Recently, demands for colorful tiles are growing, and a variety of patterns of tiles are proposed or practically used. For instance, Japanese Patent Publication No. 2-42323 or the like discloses an inlay tile having a specific pattern embedded in its superficial portion by pressure forming granulated materials. Japanese Patent Publication No. 2-8883 discloses a tile having an irregular pattern formed by disposing a material lump of clay body, mixed with coloring pigment powder, on a press die and pressing the clay body.

These patterns are applicable to square tiles of a flat plate shape, because they are formed by plane dies. However, it is difficult to apply them to the above mentioned accessory tiles which are manufactured by the press die having an inclined press surface. Therefore, when corners need to be built with colored pattern tiles, two square tiles are joined at right angles via an adhesive and stuck to the corner. Otherwise, square tiles are cemented to each other and have the joined part reinforced by an angle member made of metal or resin.

A specific shape of tiles, namely, corner cap tiles are used as accessory tiles for tiling side corners, of a stepped part, having a triangular pyramid shape where a front plane, an upper plane and a left or right side plane cross with each other. Such side corners are tiled by the same way as above by combining three square tiles.

With these ways of tiling, tiling work needs much labor and is troublesome. Moreover, in case of joining tiles by an adhesive, the contacted part is exposed and exhibits poor appearance. In case of cementing the tiles, there is a fear of abrasion. In view of the above situation, it is desirable if a variety of shapes, such as an angle plate, a corner cap or the like, can be obtained even for the accessory tiles having colored patterns. If so, a man-hour or labor for tiling work, durability or appearance could be improved drastically. Thus, it has been longed in the ceramic industry to provide such an improved technique.

SUMMARY OF THE INVENTION

It is an object of the invention to provide an accessory tile with a variety of colored patterns that are not available with a conventional molding die for accessory tiles, and to provide its manufacturing method.

It is another object of the invention to provide an accessory tile with a sufficient strength at a corner while having a variety of colored patterns that are not available with a conventional molding die for accessory tiles, and to provide its manufacturing method.

It is further object of the invention to provide an accessory tile with a good appearance while having a variety of colored patterns that are not available with a conventional molding die for accessory tiles, and to provide its manufacturing method.

According to one preferred mode of the invention, an accessory tile is provided which is made by: forming a plurality of preformed tile bodies of a clay body, the preformed tile body having a plate shape with a colored pattern provided on its surface, the preformed tile body being plastic and deformable; placing the preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion; moving a press surface of a second mold toward the press surface of the first mold, the press surface of the second mold having a shape corresponding to the shape of the press surface of the first mold; pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

According to another preferred mode of the invention, an accessory tile is provided which is made by: forming a plurality of preformed tile bodies by pressing a clay body at a first pressure, the preformed tile body having a plate shape with a colored pattern provided on its surface, the preformed tile body being plastic and deformable; placing the preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion; moving a press surface of a second mold toward the press surface of the first mold, the press surface of the second mold having a shape corresponding to the shape of the press surface of the first mold; pressing the preformed tile bodies between the press surfaces of the first and second molds, at a second pressure larger than the first pressure, so as to join the preformed tile bodies at the first ends thereof, thereby obtaining a tile body of a shape corresponding to the shape of the corner portion of the building base material; and burning the tile body.

According to another preferred mode of the invention, an accessory tile is provided which is made by: forming a plurality of preformed tile bodies of a clay body, the preformed tile body having a plate shape with a colored pattern provided on its surface, the preformed tile body being plastic and deformable; placing the preformed tile bodies on a press surface of a first mold while having ends of the preformed tile bodies positioned adjacent to each other, the press surface of the first mold having a shape corresponding to a shape of a corner portion of a building base material so that the preformed tile bodies placed on the press surface have a shape corresponding to the shape of the corner portion; interposing a joining medium between the ends of the preformed tile bodies; moving a press surface of a second mold toward the press surface of the first mold, the press surface of the second mold having a shape corresponding to the shape of the press surface of the first mold; pressing the preformed tile bodies between the press surfaces of the first and second molds so as to join the preformed tile bodies at the ends thereof, thereby obtaining a tile body of a shape corresponding to the shape of the corner portion of the building base material; and burning the tile body.

According to still another preferred mode of the invention, a manufacturing method of an accessory tile comprises the steps of: forming a plurality of preformed tile bodies of a clay body, the preformed tile body having a plate shape with a colored pattern provided on its surface, the preformed tile body being plastic and deformable; placing the preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion; moving a press surface of a second mold toward the press surface of the first mold, the press surface of the second mold having a shape corresponding to the shape of the press surface of the first mold; pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

According to still another preferred mode of the invention, a manufacturing method of an accessory tile comprises the steps of: forming a plurality of preformed tile bodies by pressing a clay body at a first pressure, the preformed tile body having a plate shape with a colored pattern provided on its surface, the preformed tile body being plastic and deformable; placing the preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion; moving a press surface of a second mold toward the press surface of the first mold, the press surface of the second mold having a shape corresponding to the shape of the press surface of the first mold; pressing the preformed tile bodies between the press surfaces of the first and second molds, at a second pressure larger than the first pressure, so as to join the preformed tile bodies at the first ends thereof, thereby obtaining a tile body of a shape corresponding to the shape of the corner portion of the building base material; and burning the tile body.

According to still another preferred mode of the invention, a manufacturing method of an accessory tile comprises the steps of: forming a plurality of preformed tile bodies of a clay body, the preformed tile body having a plate shape with a colored pattern provided on its surface, the preformed tile body being plastic and deformable; placing the preformed tile bodies on a press surface of a first mold while having ends of the preformed tile bodies positioned adjacent to each other, the press surface of the first mold having a shape corresponding to a shape of a corner portion of a building base material so that the preformed tile bodies placed on the press surface have a shape corresponding to the shape of the corner portion; interposing a joining medium between the ends of the preformed tile bodies; moving a press surface of a second mold toward the press surface of the first mold, the press surface of the second mold having a shape corresponding to the shape of the press surface of the first mold; pressing the preformed tile bodies between the press surfaces of the first and second molds so as to join the preformed tile bodies at the ends thereof, thereby obtaining a tile body of a shape corresponding to the shape of the corner portion of the building base material; and burning the tile body.

In the invention, the tile preformed bodies may have any plate shapes such as a flat plate, curved plate or the like. The colored pattern on its surface may be any one at all. If desired, a plain colored pattern may be given. The preformed tile body can be formed by primary pressing of a powder material or a clay body or the like as in the conventional tiles. However, the pressure is preferably set at a lower one. Thus, the preformed tile bodies can be compressed sufficiently at the time of a secondary pressing into a tile body or a final product shape, thereby endowing them with good joint. Still, too low primary pressure is not preferable, since the colored pattern is possibly deformed at the time of pressing. Generally, the primary pressure for forming the preformed tile bodies is preferably one half or two thirds of the secondary pressure for forming the tile body. The secondary pressure may be the same as a pressure for forming a common tile or common accessory tile or corner cap tile. The preformed tile body is preferably made into a size little smaller than a cavity size of a mold so as to make its placement in the mold easier.

Further objects and advantages of the invention will be apparent from the following description, reference being had to the accompanying drawings, wherein preferred embodiments of the invention are clearly shown.

BRIEF DESCRIPTION OF THE DRAWING

FIG. 4*a* and FIG. 4*b* are sectional views of plate tile press machines which is used in the preformed tile body forming step B in the first embodiment of the invention, respectively, wherein FIG. 4*a* illustrates a sectional view of a plate tile press machine which forms a preformed tile body 10*a* for forming a main plate 10*c*, and FIG. 4*b* illustrates a sectional view of a plate tile press machine which forms a preformed tile body 20*a* for forming a bent plate 20*c*.

FIG. 5*a* and FIG. 5*b* illustrate the preformed tile bodies in the first embodiment of the invention, respectively, wherein FIG. 5*a* illustrates a perspective view of the preformed tile body 10*a* for forming the main plate 10*c*, and FIG. 5*b* illustrates a perspective view of the preformed tile body 20*a* for forming the bent plate 20*c*.

FIG. 7*a* and FIG. 7*b* are sectional views of plate tile press machines which is used in a preformed tile body forming step B in a second embodiment of the invention, respectively, wherein FIG. 7*a* illustrates a sectional view of a plate tile press machine which forms a preformed tile body 30*a* for forming a main plate 30*c*, and FIG. 7*b* illustrates a sectional view of a plate tile press machine which forms a preformed tile body 40*a* for forming a bent plate 40*c*.

FIG. 8*a* and FIG. 8*b* are the preformed tile bodies in the second embodiment of the invention, respectively, wherein FIG. 8*a* illustrates a perspective view of the preformed tile body 30*a* for forming the main plate 30*c*, and FIG. 8*b* illustrates a perspective view of the preformed tile body 40*a* for forming the bent plate 40*c*.

FIG. 13*a* to FIG. 13*c* are perspective views, partially cut away, of upper mold ridges of accessory tile press machines of the invention, respectively, wherein FIG. 13*a* illustrates an upper mold ridge of the accessory tile press machine in the first and second embodiments, FIG. 13*b* illustrates an upper mold ridge as an example of a first modification in the fourth embodiment, and FIG. 13*c* illustrates an upper mold ridge as an example of a second modification in the fourth embodiment.

DESCRIPTION OF THE PREFERRED EMBODIMENTS

Figure 1A:
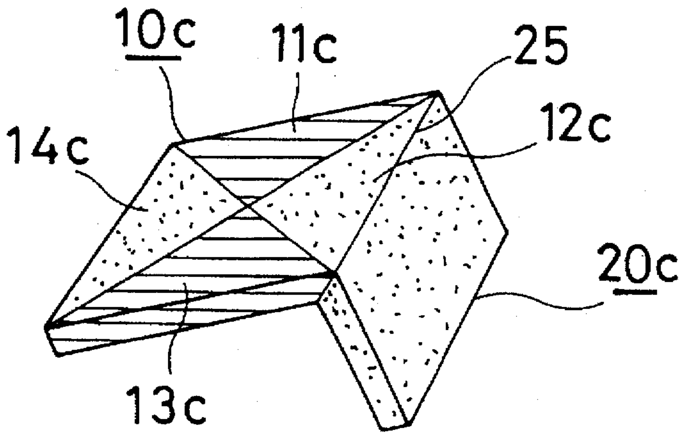
FIGS. 1*a*–1*c* illustrate perspective views of examples of accessory tiles having various colored patterns which are obtained in the first embodiment to the third embodiment of the invention.

Several preferred embodiments of the present invention will be described based on the above mentioned drawings, wherein same reference characters in the different views designate identical or corresponding parts throughout several views.

FIG. 1 illustrates several examples of accessory tiles, obtained in the present invention, which have various colored patterns on their surfaces as designs, respectively. The accessory tiles of an angle plate shape manufactured in the following embodiments have angle shapes, respectively, which are composed of two tile elements of different or same length joined at opposite ends of a perpendicular corner. They may be used for corner tiling of stepped parts of stairs, pavements or stepped parts of roads, and the like. In the following descriptions, a long tile is called a main plate, and a short one is called a bent plate.

Referring to an accessory tile in FIG. 1*a*, a long rectangular main plate 10*c* has four triangle parts 11*c*, 12*c* 13*c* and 14*c* divided by two diagonals. The main plate 10*c* has two pairs of triangle parts of different colors, namely, the first pair 11*c* and 13*c* in one color, and the second pair 12*c* and 14*c* in another color, while making each pair show symmetry. A short rectangular bent plate 20*c* is the same color as that of the adjacent triangle part 12*c*. Referring to an accessory tile in FIG. 1*b*, a long rectangular main plate 30*c* has a pair of symmetrically arranged semicircular parts 31*c* and 33*c* of different colors. The main plate 30*c* also has a pair of symmetrically arranged triangular parts 32*c* and 34*c* which have a different color from that of the semicircular parts 31*c* and 33*c*. A short rectangular bent part 40*c* is the same color as that of the adjacent semicircular part 33*c*. Referring to an accessory tile in FIG. 1*c*, a main plate 50*c* and a bent plate 60*c* have the same length. They have spread mottled patterns thereon, respectively, which are composed of first parts 51*c* and 61*c*, second parts 52*c* and 62*c*, and third parts 53*c* and 63*c*.

These colored patterns 11*c* to 14*c*, 31*c* to 34*c*, 51*c* to 53*c*, 61*c* to 63*c* go through the tile element thoroughly in its thickness direction, thereby preventing themselves fading out due to abrasion of surfaces of the tiles. It is possible to apply this invention to other various patterns of accessory tiles in accordance with the following process, as long as colored patterns go through the tile in the thickness direction.

[FIRST EMBODIMENT]

The first embodiment of the invention will be described referring to FIG. 2 to FIG. 6, taking the accessory tile of FIG. 1*a* as an example.

In FIG. 1*a*, the accessory tile has the main plate 10*c* and the bent plate 20*c* formed at both sides of the corner 25. The main plate 10*c* has four triangular parts 11*c* to 14*c*. One pair of triangles 11*c* and 13*c* are provided with light gray spots on a black background. The other pair 12*c* and 14*c* are provided with light blue spots on a white background. The bent plate 20*c* has light blue spots on a white background like the adjacent triangular part 12*c* of the main plate 10*c*. The spots of the bent plate 20*c* are exposed on its surface so as to be continual to the spot pattern of the triangular part 12*c*.

This accessory tile is manufactured as follows.

Figure 2:
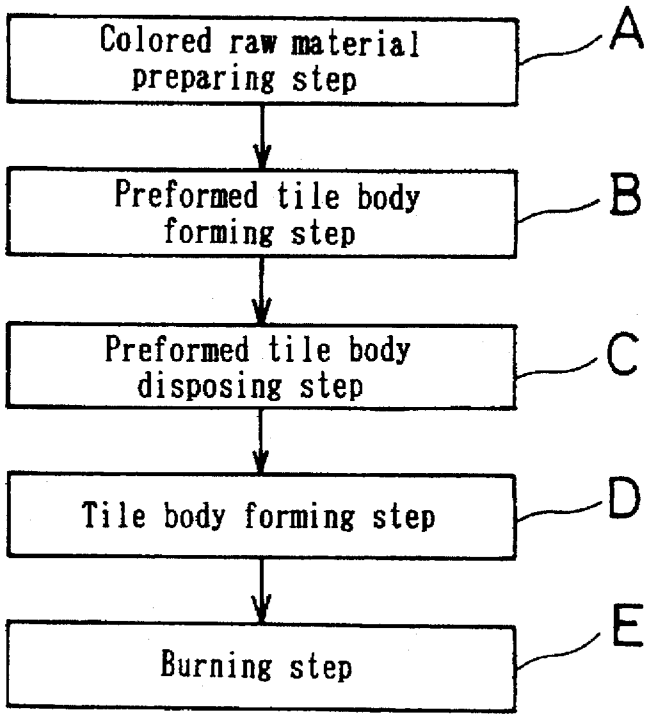
FIG. 2 shows a flowchart showing a manufacturing process of an accessory tile according to each embodiment of the invention.

FIG. 2 shows a flowchart of a manufacturing process of the first embodiment of the accessory tile of the invention. The manufacturing process has five steps. First, in a colored raw material preparing step A, a desired number of colored raw materials are prepared. In a next preformed tile body forming step B, preformed tile bodies of plate shape are formed of the colored raw materials so as to have colored patterns on their surfaces. In a preformed tile body disposing step C, the preformed tile bodies are disposed on an inclined surface of a lower mold of V-shape or reversed V-shape in cross-section. In a tile body forming step D, tile bodies of a specific shape are formed by pressing the preformed tile bodies integrally between the lower mold and an upper mold. In a last burning step E, the tile bodies are burnt to obtain accessory tiles as a final product.

Figure 3:
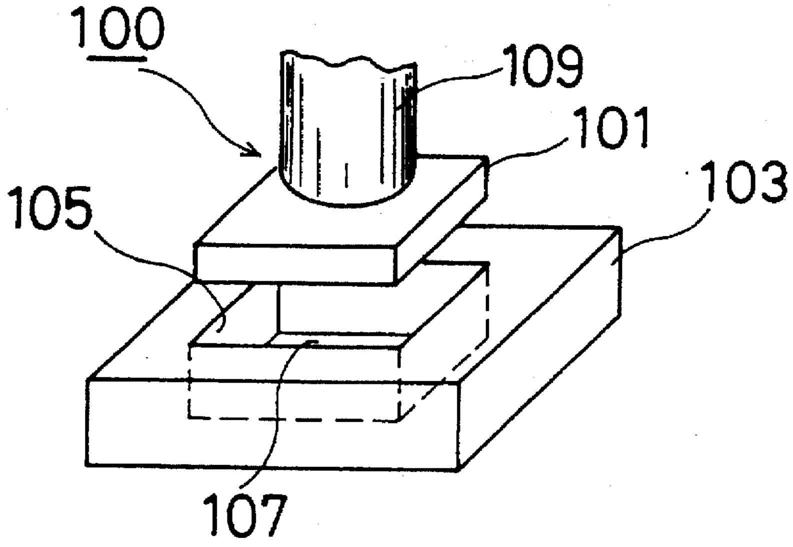
FIG. 3 illustrates a perspective view of an outline of a plate tile press machine which is used in a preformed tile body forming step B of FIG. 2.
Figure 4A:
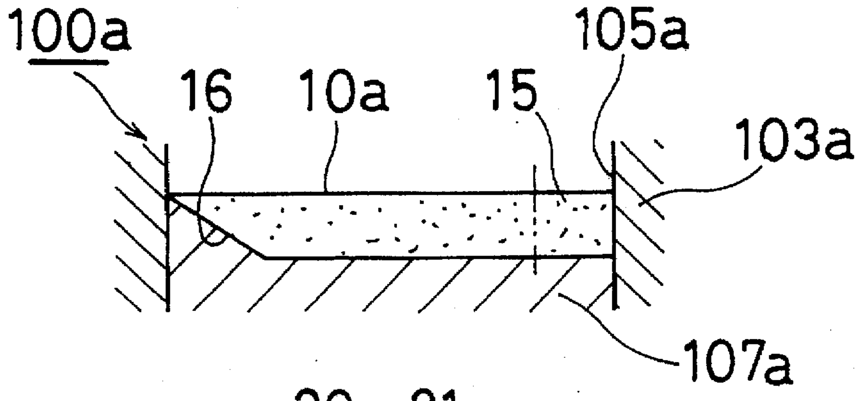
Figure 4B:
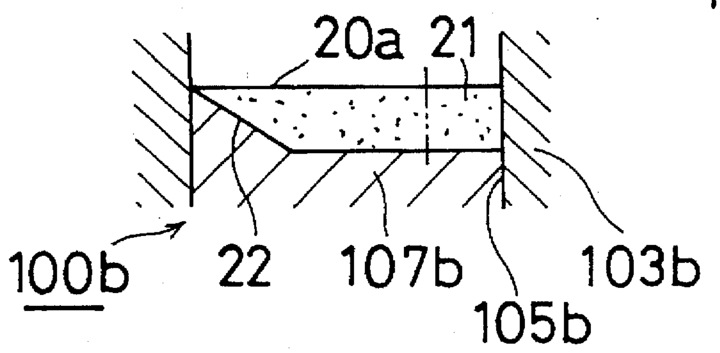
Figure 5A:
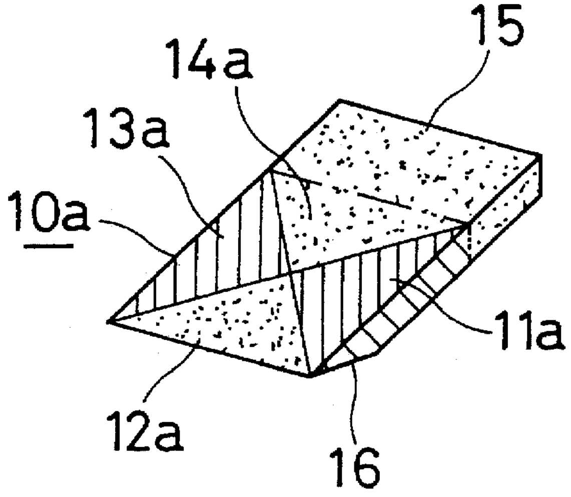
Figure 5B:
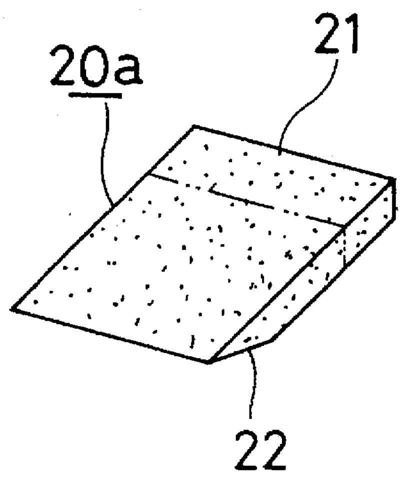

FIG. 3 illustrates a perspective view of an outline of a plate tile press machine 100 which is used in the preformed tile body forming step B of FIG. 2. FIG. 4*a* and FIG. 4*b* illustrate sectional views of plate tile press machines **100*a* and 100*b*** which are used in the preformed tile body forming step B. FIG. 4*a* illustrates a sectional view of the plate tile press machine **100*a* which forms the preformed tile body 10*a* for forming the main plate 10*c***. FIG. 4*b* illustrates a sectional view of the plate tile press machine **100*b* which forms the preformed tile body 20*a* for forming the bent plate 20*c***. FIG. 5*a* and FIG. 5*b* illustrate the preformed tile bodies. FIG. 5*a* illustrates a perspective view of the preformed tile body **10*a* for forming the main plate 10*c***. FIG. 5*b* illustrates a perspective view of the preformed tile body **20*a* for forming the bent plate 20*c***.

In FIG. 3, the plate tile press machine 100 has an upper mold 101 and a lower mold 103. At the center of the lower mold 103, a cavity 105 is provided. The cavity 105 has an identical square shape, in plan view, with a profile of side surface of the preformed tile bodies **10*a* and 20*a*, which define initial product for forming the main plate 10*c* and the bent plate 20*c*. A pusher 107 has the same outline, in plan view, with that of the cavity 105. A shape of an upper surface, used for pressing, of the pusher 107 is identical with a shape of a bottom surface of the preformed tile body 10*a*, 20*a*. The pusher 107 is movable up and down inside the cavity 105 by a cylinder (not such as a hydraulic cylinder (not shown). The upper mold 101 has the same outline, in plan view, as that of the cavity 105. A bottom surface, used for pressing, of the upper mold 101 has an identical shape with the upper surface of the preformed tile body 10*a*, 20*a*. The upper mold 101 is movable up and down to adjust an interval to the lower mold 103 or the pusher 107 through the driving shaft 109 by a driving unit such as a hydraulic cylinder (not shown), thereby to define a forming space together with the pusher 107 and the cavity 105 in an appropriate dimension. FIG. 3 shows only the outline structure of the plate tile press machine 100, and the sizes and shapes of the upper mold 101, lower mold 103, cavity 105 and pusher 107 are modified in accordance with the size and shape of a preformed tile body. For instance, the sizes and shapes of the main plate 10*c* and the bent plate 20*c* are not identical in this embodiment. The structures of the plate tile press machine 100*a* for forming the preformed tile body 10*a* and the plate tile press machine 100*b* for forming the preformed tile body 20*a* are substantially alike. However, as shown in FIG. 4, sizes and shapes of a cavity 105*a* of a lower mold 103*a* and a cavity 105*b* of a lower mold 103*b*, or pushers 107*a* and 107*b* are different. Accordingly, a size and a shape of the upper molds 101 are also different for each of the machines 100*a* and 100*b***, though not shown.

In FIG. 5*a* and FIG. 5*b*, two kinds of tile bodies **10*a* and 20*a* are prepared. Namely, a preformed main plate body 10*a* forms the main plate 10*c*, and a preformed bent plate body 20*a* forms the bent plate 20*c*. The preformed main plate body 10*a* has four colored triangular parts 11*a*, 12*a*, 13*a* and 14*a* which are finally made into the triangular parts 11*c*, 12*c*, 13*c* and 14*c* of the main plate 10*c*, respectively. The preformed main plate body 10*a* and preformed bent plate body 20*a* has trimmed parts 15 and 21, respectively, in the preformed tile body forming step B. When the preformed tile bodies 10*a* and 20*a* are joined to each other and burned to form an accessory tile, the trimmed parts 15 and 21** are cut off along the two-dot chain lines shown in the FIGS. 4*a*, 4*b* and 6. Namely, the length of the main plate **10*c* and the bent plate 20*c* are not same in this embodiment, so that two types of the cavities 105*a* and 105*b* are prepared for forming the preformed main plate body 10*a* and the preformed bent plate body 20*a***.

A substantially rectangular parallelepiped forming space is defined by the upper mold 101, cavity **105*a* and the pusher 107*a*. The forming space has the same shape as that of the preformed main plate body 10*a* and has a dimension of 103 mm wide, 120 mm long and 13 mm deep. Also, a substantially rectangular parallelepiped forming space is defined by the upper mold 101, cavity 105*b* and pusher 107*b*. The forming space has the same shape as that of the preformed bent plate body 20*a* or is shorter than the length of the forming space for the preformed main plate body 10*a*. It has a dimension of 103 mm wide, 55 mm long and 13 mm deep. The bottom surface of the upper mold 101 for forming the preformed main plate body 10*a* is sized 103 mm wide and 120 mm long. The bottom surface of the upper mold 101 for forming the preformed bent plate body 20*a* is sized 103 mm wide and 55 mm long. Inclined joining surfaces 16 and 22 are provided on one longitudinal ends of the preformed tile bodies 10*a* and 20*a*, respectively. Such joining surfaces are to be contacted and joined to each other in following steps. An angle of an upper edge, at the one end, of the preformed tile body 10*a*, 20*a* is 45 degrees and an angle of a lower edge, at the one end, of the preformed tile body 10*a*, 20*a*** is 135 degrees, as shown in FIG. 4*a* and FIG. 4*b*. When the joining surfaces 16 and 22 are joined, the preformed main plate body **10*a* and the preformed bent plate body 20*a* cross at right angles. Then, the joining area of the preformed main plate body 10*a* and the preformed bent plate body 20*a* are enlarged, therefore, the bonding force and corner strength are increased. One longitudinal ends of the pusher 107*a* and the pusher 107*b* is inclined in accordance with such edge angles of the preformed tile bodies 10*a* and 20*a*. Namely, an acute edge of 45 degrees is defined between the one end of the pusher 107*a*, 107*b* and the upper mold 101. On the other hand, an obtuse edge of 135 degrees is defined between the inclined part and the plane part of the pusher 107*a*, 107*b***.

Figure 6:
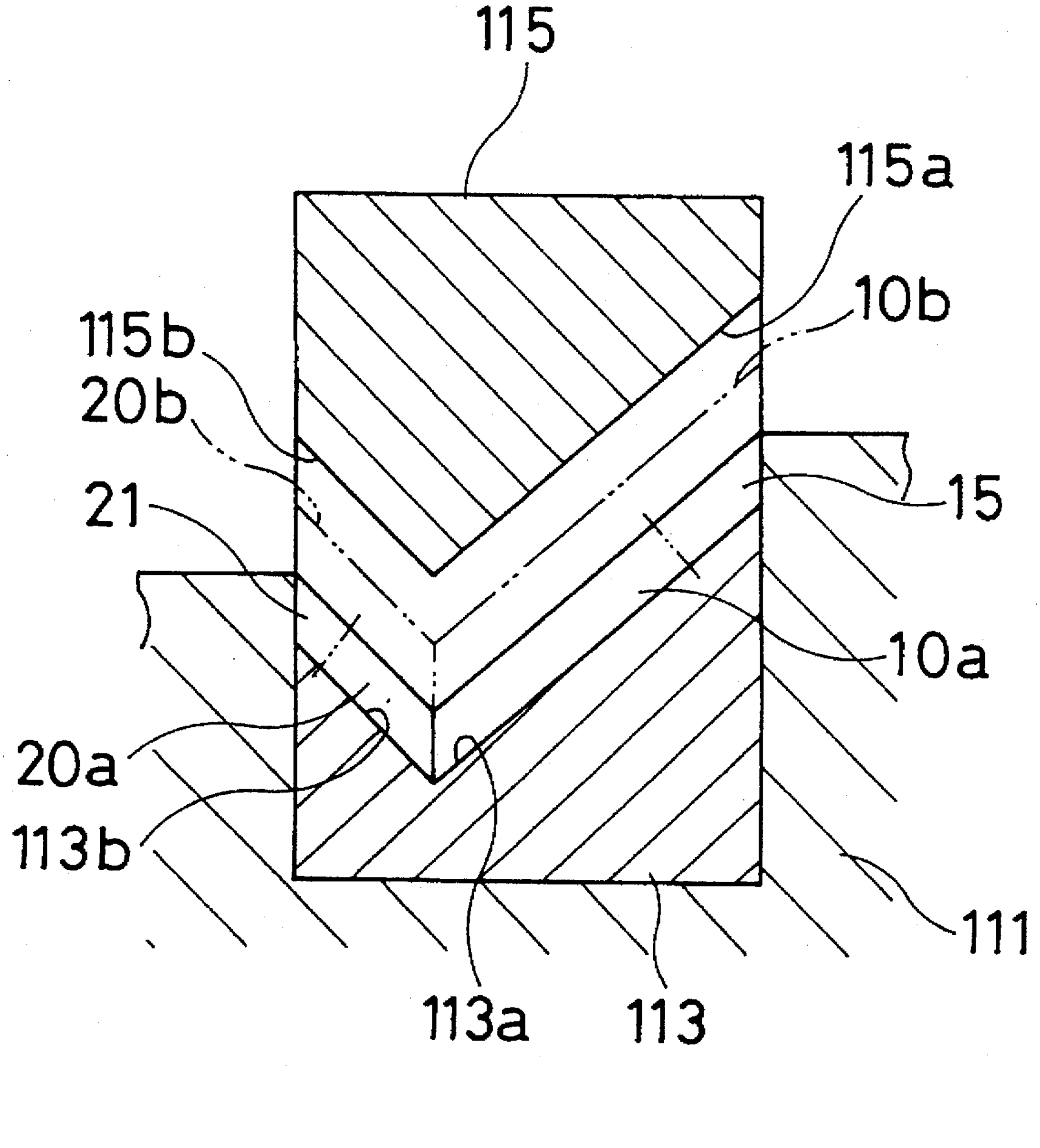
FIG. 6 illustrates a sectional view of an outline of an accessory tile press machine in operating condition which is used in a tile body forming step D in the first embodiment of the invention.

FIG. 6 illustrates a sectional view of the outline of an accessory tile press machine, in operating condition, which is used in the tile body forming step D of FIG. 2. The accessory tile press machine has a main mold 111, a lower mold 113 and an upper mold 115. The lower mold 113 has a press surface of a V-shaped cross section composed of a pair of flat sides **113*a* and 113*b* which crosses at an angle corresponding to an angle of a corner to be tiled, such as pillars, steps or the like. The upper mold 115 has a press surface of a V-shaped cross section composed of a pair of flat sides 115*a* and 115*b* which crosses at an angle corresponding to the edge angle of the press surface 113*a* and 113*b* of the lower mold 113. In this embodiment, the flat sides 113*a* and 113*b* cross at right angles to form a valley. Also, the flat sides 115*a* and 115*b* cross at right angles to form a ridge. The upper mold 115 is movable up and down to adjust the interval to the lower mold 113 by a driving unit such as a hydraulic cylinder and so on. The lower mold 113 is movable up and down inside the main mold 111** by a driving unit such as a hydraulic cylinder and so on (not shown).

The process of making accessory tile of this embodiment by using the plate tile press machine and the accessory tile press machine is as follows.

To begin with, in the colored raw material preparing step A, colored granules used for making the preformed tile body **10*a*** are prepared as follows. A crushed and mixed raw material consisting of 50% of feldspar, 20% china clay, 10% kaolin and 20% clay is used herein. Three kinds of crashed and mixed raw materials are prepared: a first material adding 5% black pigment (belonging to a group of CoO, $Cr_2O_3$, $Fe_2O_3$) to the above crashed and mixed raw material; a second material adding 5% blue pigment (belonging to a group of $ZrSiO_4(V)$ or $ZrO_2$—$SiO_2$—$V_2O_5$); and a third material without any pigment added. Water is added to each kind of these materials. They are then mixed and ground by a trommel or the like into a slip, and granulated by a spray drier into granules of a fixed moisture content (granule diameter of about 70 um). Thus, black, blue and uncolored (white) granules are prepared.

The preformed tile body is prepared using these colored granules (including white ones) as mentioned below.

In the preformed tile body forming step B, as shown in FIG. 4, the pusher 107*a* is lowered to a forming position, then the rectangular parallelepiped forming space (size of 103 mm wide, 120 mm long, 13 mm deep) is formed between the cavity 105*a* of the lower mold 103*a* and the upper surface of the pusher 107*a* of the plate tile press machine 100*a*. A 15 mm height partition plate (not shown) is disposed diagonally in a square part, excepting an area of the joining surface 16, 22, of the forming space. Thus, the forming space is divided into four isosceles right triangle spaces corresponding to the triangular parts 11*a*, 12*a*, 13*a* and 14*a* of the preformed tile body 10*a*. Then, a mixture of the same quantity of the uncolored (white) granules and the black granules is filled in the laterally facing pair of the triangle spaces for forming the triangular parts 11*a* and 13*a*. A mixture of the same quantity of the uncolored (white) granules and the blue granules is filled in the longitudinally facing pair of the triangle spaces for forming the triangle parts 12*a* and 14*a*. A mixture of the same quantity of the white granules and the blue granules, which is the same color as the color of the triangle part 12*a* or 14*a*, is filled in a rectangular space adjacent to the triangle space for forming the triangle part 14*a* (the right area from the two-dot chain line in FIG. 4*a*), thereby to form the trimmed part 15. Thereafter, the partition plate is removed, and the granules are pressed by lowering the upper mold 101 so as to form the preformed main plate body 10*a*, having a colored pattern shown in FIG. 5*a*, and the trimmed part 15 into one body. The preformed main plate body 10*a* has the inclined joining surface 16 which is formed by the inclined surface of the pusher 107*a* at the bottom surface of the joining end.

A mixture of the white granules and the blue granules is filled in the forming space (size of 103 mm wide, 55 mm long, and 13 mm deep) of the lower mold 103*b*, then the granules are pressed to obtain the preformed bent plate body 20*a*. As shown in FIG. 4*b*, the pusher 107*b* is lowered to a forming position, then the rectangular parallelepiped forming space (size of 103 mm wide, 55 mm long, 13 mm deep) is formed between the cavity 105*b* of the lower mold 103*b* and the upper surface of the pusher 107*b* of the plate tile press machine 100*b*. A mixture of the same quantity of the white granules and the blue granules, which is the same color as that of the adjacent triangle part 12*a* of the preformed main plate body 10*a*, is filled in the forming space. A mixture of the same quantity of the white granules and the blue granules, which is the same color as that of the square preformed bent plate body 20*a*, is filled in a narrow rectangular space adjacent to the square forming space for making the preformed tile body 20*a* (the right area from the two-dot chain line in FIG. 4*b*), thereby to form the trimmed part 21. Thereafter, the granules in the forming space are pressed by lowering the upper mold 101 of the plate tile press machine 100*b* so as to obtain the preformed bent plate body 20*a* and the trimmed part 21, which have a single color shown in FIG. 5*b*, in one body. The preformed bent plate body 20*a* has the inclined joining surface 22, which is formed by the inclined surface of the pusher 107*b*, at the bottom surface of the joining end.

The above mentioned primary pressure forming work, as the preformed tile body forming step B, for forming the preformed tile bodies 10*a* and 20*a* is carried out at a pressure of 50 to 100 kg/cm$^2$. Each of the preformed tile bodies 10*a* and 20*a* after pressing has a thickness of 10±0.5 mm. Here, the pressure is not limited to the above mentioned range. If the shape of preformed tile bodies is not damaged at the time of transferring them to the accessory tile press machine after the primary pressure forming work, a lower pressure or a higher pressure is admitted vice versa, depending on a kind of clay bodies as raw materials, an adhesive such as CMC or the like, or a mixture percentage of the clay body and adhesive. If the pressure is 50 kg/cm$^2$ or more, the shape of the preformed tile body 10*a*, 20*a* is kept in a desired one more reliably, in case of the pressure forming with commonly used raw material. That is, the primary pressure is high enough, thereby increasing strength of the whole or the corner of the preformed tile bodies, while maintaining accessory tiles in high quality. If the pressure is 100 kg/cm$^2$ or less, when forming a tile body in a below mentioned secondary pressure forming work, as the tile body forming step D, it is possible to set a difference between the primary pressure and the secondary pressure large, thereby joining more securely the preformed main plate body 10*a* and the preformed bent plate body 20*a*.

As mentioned above, the preformed tile bodies 10*a* and 20*a* have the trimmed parts 15 and 21 of a length of about 20 mm provided at one longitudinal ends, respectively, which are unnecessary parts in the final products of tiles. These trimmed parts 15 and 21 are removed by cutting in a following step. Therefore, uncolored or white granules are filled in the forming spaces therefor. Since the trimmed parts 15 and 21 have no influence on an appearance of the final product, any colored or uncolored material may be used therefor. In forming the preformed main plate body 10*a*, the partition plate is diagonally disposed only in a square part (103 mm square) of the forming space defined between the cavity 105*b* of the lower mold 103*a* and the pusher 107*a*, while excepting a part for forming the trimmed part 15 (about 20 mm wide).

Thus manufactured preformed main plate body 10*a* and preformed bent plate body 20*a* are taken out by pushing up the pushers 107*a* and 107*b* for facilitating taking-out work of the preformed tile bodies from the cavities 105*a* and 105*b*.

In the preformed tile body disposing step C, two kinds of preformed tile bodies 10*a* and 20*a*, obtained in the preformed tile body forming step B, are respectively disposed on the pressure forming die of a shape corresponding to a shape of a finished accessory tile. As shown in FIG. 6, the lower mold 113 of the accessory tile press machine is lowered to a forming position shown by a solid line in FIG. 6. Then, a forming space, which corresponds to a specific shape of a tile body, is formed between the press surface 113*a* and 113*b* of the lower mold 113 and the inner side surface of the main mold 111. Then, the preformed main plate body 10*a* and the preformed bent plate body 20*a* are respectively disposed on flat sides 113*a* and 113*b* of the press surface of the lower mold 113. Describing this step more specifically, the preformed main plate body 10*a* (left in FIG. 6) is disposed on the flat side 113*a* of the press surface, while having a sharp edge side of the joining surface 16 placed downward so that the sharp edge meets with the perpendicular corner or valley defined between the flat sides 113_a_ and 113_b_ of the V-shaped press surface of the lower mold 113.

Then, a sharp edge side of the joining surface 22 of the preformed bent plate body 20_a_ (right end in FIG. 6) is disposed on the flat side 113_b_ of the press surface, while having a sharp edge side of the joining surface 22 placed downward so that the sharp edge meets with the perpendicular corner of the V-shaped press surface. Thus, the joining surfaces 16 and 22 contact closely to each other. The thicknesses of the preformed tile bodies 10_a_ and 20_a_ are equal. Both the joining surfaces 16 and 22 have the sharp edges of the equal angles of 45 degrees. Consequently, areas of the joining surface 16 and 22 are equal, so that both the joining surfaces 16 and 22 are closely stuck without any surplus area. When the joining surfaces 16 and 22 are contacted closely, a corner of the angle tile body, which is defined around the joining surfaces 16 and 22, becomes perpendicular. Thus, the corner angle corresponds to the corner angle of the press surface 113_a_ and 113_b_ of the lower mold 113. As a result, the preformed tile bodies 10_a_ and 20_a_ are closely disposed on the press surface 113_a_ and 113_b_.

The trimmed parts 15 and 21 of the preformed tile bodies 10_a_ and 20_a_ are positioned outward on the press surface of the lower mold 113.

Accordingly, the preformed tile bodies 10_a_ and 20_a_ on the press surface 113_a_ and 113_b_ take a position as shown in FIG. 6.

In the accessory tile forming step D, the upper mold 115 is lowered toward the lower mold 113 on which the preformed tile bodies 10_a_ and 20_a_ are disposed. Both of the preformed tile bodies 10_a_ and 20_a_ are pressed between the press surface 113_a_ and 113_b_ of the lower mold 113 and the press surface 115_a_ and 115_b_ of the upper mold 115. The preformed tile bodies 10_a_ and 20_a_ are joined at the joining surfaces 16 and 22. Then, a main plate body element 10_b_ is obtained from the preformed main plate body 10_a_, and a bent plate body element 20_b_ is obtained from the preformed bent plate body 20_a_. After this step, as shown in FIG. 6, there is produced a tile body of an angle plate shape, which is composed of a pair of tile body elements 10_b_ and 20_b_ and which has smooth upper and lower surfaces without any joint line exposed on the corner.

The size of the flat side 113_a_, for disposing the preformed main plate body 10_a_, of the lower mold 113 is 105 mm wide and 123 mm long. The size of the flat side 113_b_, for disposing the preformed bent plate body 20_a_, of the lower mold 113 is 105 mm wide and 57 mm long. The lowering limit of the lower mold 113 is within 10 mm from the upper end of the inner surface of the main mold 111. Therefore, the size of the above mentioned accessory tile forming space is: 105 mm wide, 123 mm long and 10 mm deep for the preformed main plate body 10_a_, and 105 mm wide, 57 mm long and 10 mm deep for the preformed bent body 20_a_. The depth of the forming space of the accessory tile press machine for the secondary pressure forming work is a little smaller (about a few millimeter) than that of the plate tile press machine for the primary pressure forming work. This is because the performed tile bodies 10_a_ and 20_a_ are to be compressed in the thickness directions, in the secondary pressure forming work, so as to make the joining surfaces 16 and 22 stuck strongly. The width and length of the forming space of the accessory tile press machine for the secondary pressure forming work are set a little wider (about a few millimeter) than those of the plate tile press machine for the primary pressure forming work. This is because some extra space should be given for permitting the materials to spread at the time of compressing the performed tile bodies 10_a_ and 20_a_ in the thickness direction in the secondary pressure forming work.

In the accessory tile forming step D of this embodiment, the pressure of the secondary pressure forming step is set at 300 $kg/cm^2$ in consideration of the primary pressure of 50 to 100 $kg/cm^2$ in the preformed tile body forming step B. The accessory tile body elements 10_b_ and 20_b_ are compressed respectively into a thickness of 8 mm. Here, the pressure is not restricted to the above mentioned one. If the preformed tile bodies 10_a_ and 20_a_ are completely joined at the corner ends in the secondary pressure forming work, a lower or higher pressure is admitted, depending on a kind of clay bodies as raw materials and an adhesive such as CMC, or a mixture percentage of the clay body and adhesive, or the primary pressure. It is preferable to set the secondary pressure to two or more times as large as the primary pressure. It is more preferable to set it three or more times as large as the primary pressure. This makes it possible to join the preformed tile bodies 10_a_ and 20_a_ more firmly, thereby to provide an accessory tile of higher strength and quality. That is, the larger the pressure difference becomes between the primary pressure and the secondary pressure, the higher the joining force of the preformed tile bodies 10_a_ and 20_a_ becomes. This increases the strength of the whole or the corner of the tile body, and also makes the accessory tile of high quality.

The accessory tile body elements 10_b_ and 20_b_ are taken out after pulling up the upper mold 115 to separate it from the lower mold 113, pushing up the lower mold 31 to a taken-up level, and bringing the upper surface of the tile body elements 10_b_ and 20_b_ above the top end of the main mold 111. Such a position is shown by the tow-dot chain line in FIG. 6.

Thus obtained tile body has the trimmed parts 15 and 21 of approximately 20 mm long continuously provided at its outside ends, namely, at outer positions than a necessary part used for the final product. These trimmed parts 15 and 21 are removed by cutting by a cutter along the two-dot chain line shown in FIG. 6. Since the accessory tile body elements 10_b_ and 20_b_ are pressed and joined by a sufficient secondary pressing force, which is two or more times as large as that of the primary pressure, the tile body has enough strength to bear any works such as cutting or trimming of the trimmed parts 15 and 21 by hand to a sufficient degree, unless it is intended to destroy them. Moreover, the corner of the tile body is given sufficiently large strength since it is formed by joining surfaces 16 and 22 whose surfaces are larger than those of right angle ends.

In the burning step E, the accessory tile bodies obtained in the tile body forming step D are arranged in a chamotte sagger at appropriate intervals therebetween. They are burned four hours at a temperature of 1200° C. and sintered. The thickness of the accessory tile which was about 8 mm comes into about 7.5 mm after burning. Thus, the finished accessory tile is obtained.

As shown in FIG. 1_a_, this accessory tile has the main plate 10_c_, which is 100 mm wide, 100 mm long and 7.5 mm thick, and the bent plate 20_c_, which is 100 mm wide, 35 mm long and 7.5 mm thick, at opposite sides of the rectangular corner 25. The main plate 10_c_ is diagonally divided into four triangle parts 11_c_, 12_c_ 13_c_ and 14_c_. One pair 11_c_ and 13_c_ has the light gray spotted pattern on the black background and the other pair 12_c_ and 14_c_ has the light blue spotted pattern on the white background. The bent plate 20_c_ has the light blue spotted pattern on the white background, which is the same as the pattern of the adjacent triangle part 12*c* of the main plate 10*c*.

According to the present embodiment, since the plate shaped preformed tile bodies 10*a* and 20*a* are given colored patterns on their surfaces beforehand, such patterns appear on the surface of the accessory tile as they are, so that it is possible to obtain various desirable patterns that would be difficult to provide in conventional molds for accessory tiles. Moreover, the plural preformed tile bodies 10*a* and 20*a* are joined integrally to each other at the joining ends 16 and 22 into a predetermined shape of , molded body, corresponding to the shape of a tiled corner without any joint line, and then burned for obtaining stronger tiles. Therefore, the finished tile has a good appearance and sufficient corner strength.

In this embodiment, an accessory tile can be obtained just by contacting a pair of joining ends 16 and 22 of the preformed tile bodies 10*a* and 20*a*, joining them and burning, so that the number of raw material parts used for manufacturing are decreased, and the production costs of the accessory tiles are kept low. Furthermore, the pressure for the tile forming is set larger than that for preformed tile body forming, and both of the preformed tile body 10*a*, 20*a* and tile body 10*b*, 20*b* are formed by pressure forming. Accordingly, the dry molding method, which is rather simple, can be used for these pressure formings, thereby cutting down the production costs. A desired angle shape of accessory tiles can be provided for the corner of the steps or stairs, pillars or the like, so that tiling becomes easier even if corner shapes have many variations, and work efficiency is improved. Also, a pair of preformed tile bodies 10*a* and 20*a* having the inclined joining ends 16 and 22 are joined, so that the joining area and joining force is increased. It makes it possible to give higher strength and quality to the corner of the tile, thereby endowing the accessory tile corners with more strength.

In this embodiment, the angle of joining surface 16, 22 is set at 45 degrees, so that the pressure is uniformly transmitted thereto and stronger joint force is obtained. No part of the joined end surfaces of the preformed tile bodies 10*a* and 20*a* appear in a design surface or an exterior surface when tiled. Therefore, the present embodiment can be applied to preformed tile bodies which have a color or pattern on circumferential end surfaces which is different from a general pattern of a design surface, since no such different color or pattern is exposed and affects the appearance of the accessory tile.

[SECOND EMBODIMENT]

The second embodiment of the invention will be described referring to FIGS. 7 to 9, taking the accessory tile of FIG. 1*b* as an example.

Figure 1B:
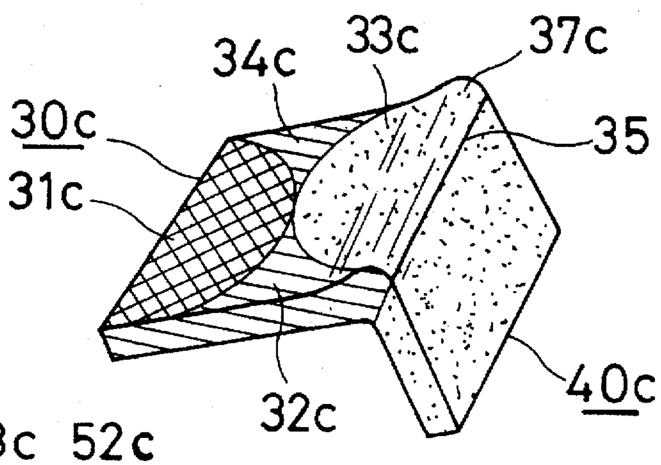

In FIG. 1*b*, the accessory tile has the main plate 30*c* and the bent plate 40*c* at both sides of the perpendicular corner 35. The main plate 30*c* has pattern composed of a pair of semicircular parts 31*c* and 33*c*, one of which is yellow and the other of which is pink, and the other triangular parts 32*c* and 34*c* both of which are white. The bent plate 40*c* has a pattern of the same pink color as the adjacent semicircular part 33*c* of the main plate 30*c*. A draining projection 37*c* is formed on the main plate 30*a* near the corner 35. The draining projection 37*c* has a curved surface and is protruded in the thickness direction of the main plate 30*c*. When the main plate 30*c* with the draining projection 37*c* is used around a kitchen sink, the main plate 30*c* can drain water on its surface through the draining projection 37*c*.

This accessory tile is manufactured as mentioned below, according to a manufacturing method similar to that of the first embodiment shown in FIG. 2.

Figure 7A:
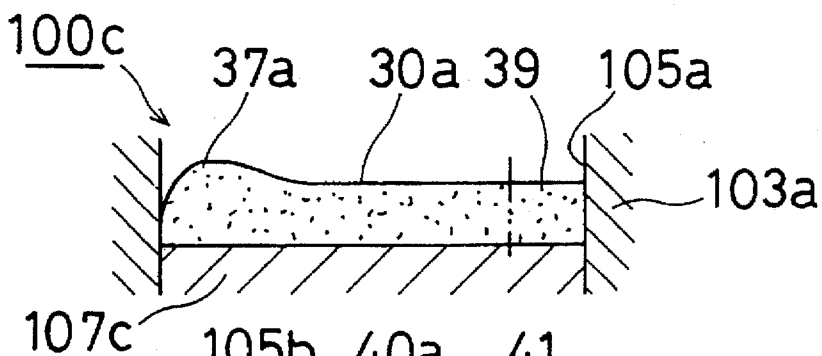
Figure 7B:
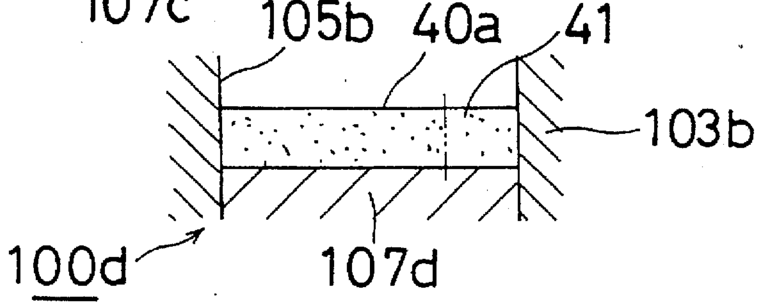
Figure 8A:
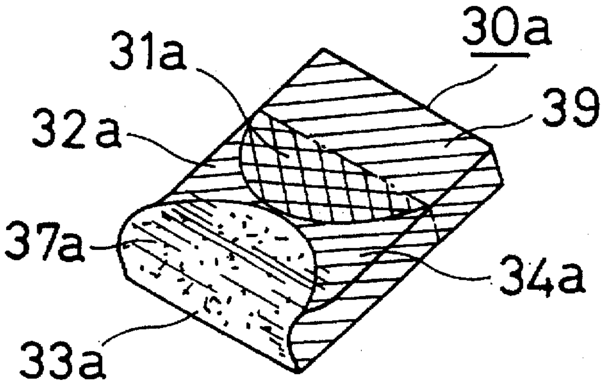
Figure 8B:
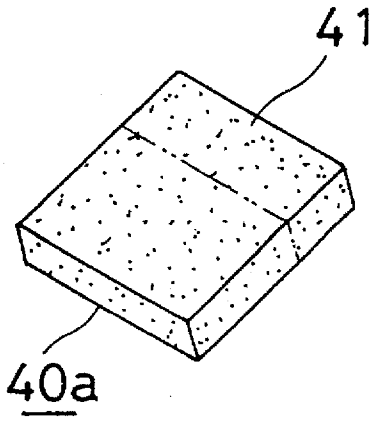

FIG. 7*a* and FIG. 7*b* respectively illustrate sectional views of plate tile press machines which are used in a preformed tile body forming step B in this embodiment. FIG. 7*a* illustrates a sectional view of a plate tile press machine 100*c* which presses a preformed tile body 30*a* so as to form the main plate 30*c*. FIG. 7*b* illustrates a sectional view of a plate tile press machine 100*d* which presses a preformed tile body 40*a* so as to form the bent plate 40*c*. FIG. 8*a* and FIG. 8*b* respectively show preformed tile bodies 30*a* and 40*a*. FIG. 8*a* illustrates a perspective view of the preformed tile body 30*a*. FIG. 8*b* illustrates a perspective view of the preformed tile body 40*a*.

In FIG. 7*a* and FIG. 7*b*, the basic constructions of the plate tile press machines 100*c* and 100*d* are similar to those of the plate tile press machines 100*a* and 100*b* shown in FIG. 4*a* and FIG. 4*b* used in the first embodiment. However, they have some structural differences in pushers 107*c* and 107*d*. Sizes and shapes of the main plate 30*c* and the bent plate 40*c* are different, too, in this embodiment. In view thererof, forming spaces 105*a* and 105*b* and the pushers 107*c* and 107*d* of lower molds 103*a* and 103*b* are different in size and shape, though the basic structures of the plate tile press machines 100*c* and 100*d* are same, as shown FIG. 7*a* and FIG. 7*b*. Accordingly, upper molds 101 of the press machines 100*c* and 100*d* (not shown in FIG. 7*a* and FIG. 7*b*) are different from each other in size and shape. Upper surfaces of the pushers 107*c* and 107*d* respectively form forming spaces for the preformed tile bodies 30*a* and 40*a* together with cavities 105*a* and 105*b*. The upper surface of the pusher 107*c*, 107*d* is simply flat and level, since joining ends of the preformed tile bodies 30*a* and 40*a* are rectangular and the end surfaces perpendicularly extend in the thickness direction.

As shown in FIG. 8*a* and FIG. 8b, the preformed tile bodies of this embodiment are composed of a preformed main plate body 30*a* for forming the main plate 30*c* and a preformed bent plate body 40*a* for forming the bent plate 40*c*. The preformed main plate body 30*a* has two semicircular parts 31*a* and 33*a* and two triangular parts 32*a* and 34*a*. The semicirculart parts 31*a* and 33*a* finally become the semicircular parts 31*c* and 33*c* and the triangular parts 32*a* and 34*a* become the triangular parts 32*c* and 34*c* of the main plate 30*c*. The preformed main plate body 30*a* and the preformed bent plate body 40*a* have trimmed parts 39 and 41, respectively, in the preformed tile body forming step B. When the preformed tile bodies 30*a* and 40*a* are joined and burned to form an accessory tile, the trimmed parts 39 and 41 are cut off along two-dot chain lines in FIGS. 7*a*, 7*b*, 8*a*, 8*b* and 9. The length of the preformed main plate body 30*a* and the preformed bent plate body 40*a* are not equal in this embodiment, so that two types of lower molds 103*a* and 103*b* having cavities 105*a* and 105*b* are prepared for respectively forming them.

A rectangular parallelepiped forming space, which is defined by the cavity 105*a* and the pusher 107*c*, is 103 mm wide, 120 mm long, 13 mm deep. Also, a rectangular parallelepiped space, which is formed by the cavity 105*b* and the pusher 107*d*, is 103 mm wide, 55 mm long, 13 mm deep. A bottom surface, as a press surface, of the upper mold 101 for forming the preformed main plate body 30*a* is sized 103 mm wide and 120 mm long. A bottom surface, as a press surface, of the upper mold 101 for forming the preformed bent plate body 40*a* is sized 103 mm wide and 55 mm long. As mentioned above, one longitudinal end (left end in FIGS. 7*a* and 7*b*) of the forming space, which is designed to form the corner 35, is perpendicular to a horizontal plane. Thus, the joining ends of the preformed main plate body 30*a* and the preformed bent plate body 40a are met at right angles. The joining end surface (left end surface in FIG. 7b) of the preformed bent plate body 40a is attached to a joining end portion (left in FIG. 7a) of the bottom surface of the preformed main plate body 30a. Thereby, the preformed tile bodies 30a and 40a are crossed at an angle of 90 degrees. Accordingly, the pusher 107a, 107 of the present embodiment has no slope provided at the left end, contrary to the first embodiment, but shaped totally flat so as to make perpendicular corner with the cavity 105a, 105b, as shown in FIG. 7a and FIG. 7b. The press surface of the upper mold 101 (not shown) for forming the preformed main plate body 30a has a shape corresponding to the upper surface of the preformed main plate body 30a, as shown in FIG. 7a, so that the draining projection 37c is integrally formed at the joining end of the preformed main plate body 30a at the time of pressing.

Figure 9:
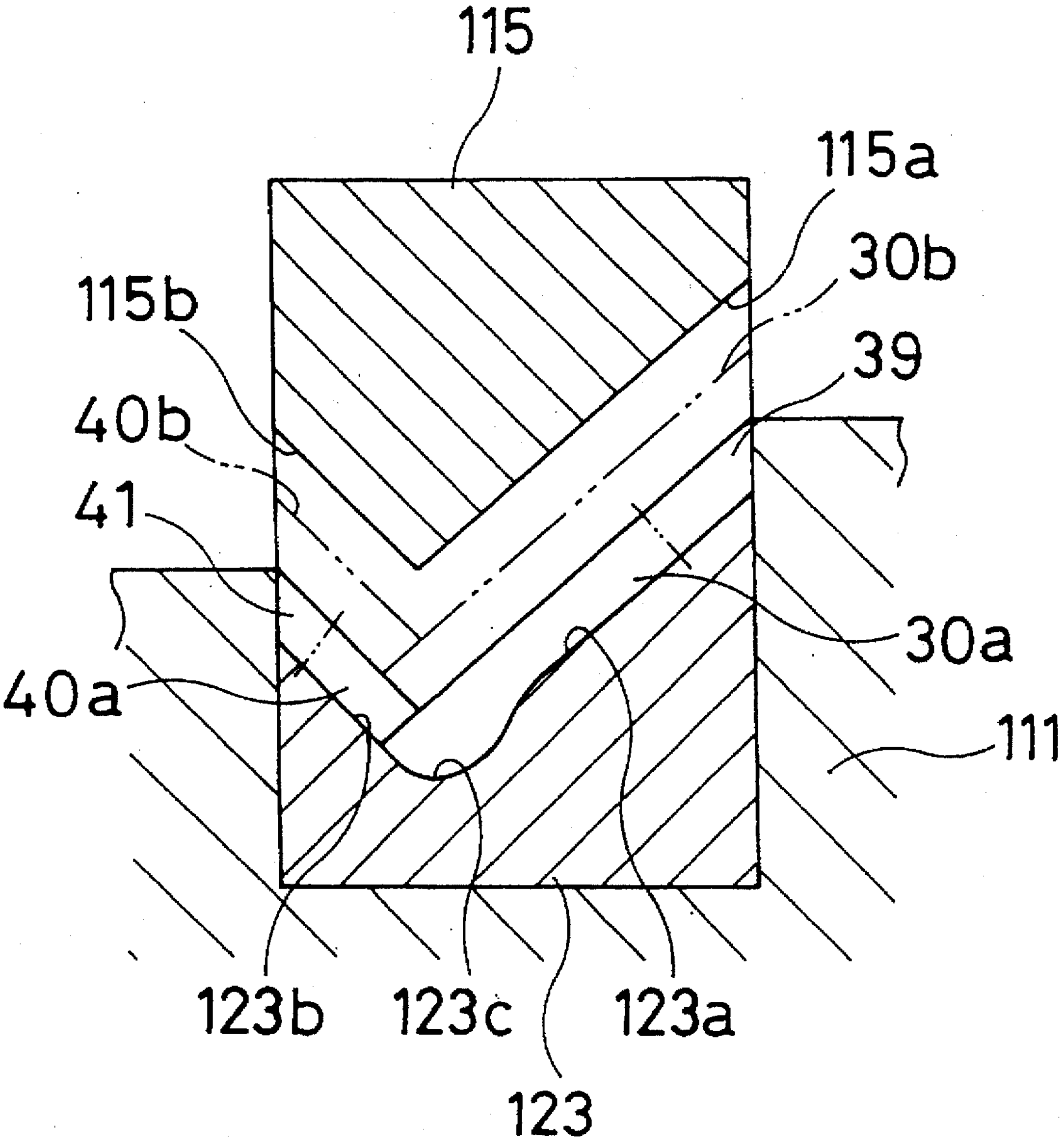
FIG. 9 illustrates a sectional view of an outline of an accessory tile press machine in operating condition which is used in a tile body forming step D in the second embodiment of the invention.

FIG. 9 illustrates a sectional view of an outline of an accessory tile press machine, in operating condition, which is used in a tile body forming step D in this embodiment. The basic structure of the accessory tile press machine is similar to that of the accessory tile press machine used in the first embodiment shown in FIG. 6. However, the structure of the press surface of the lower mold 123 is different from that of the first embodiment, since it is necessary to form the draining projection 37c on the main plate 30c. The press surface is composed of a pair of flat sides 123a and 123b and a curved dent 123c. The flat sides 123a and 123b and the curved dent 123c define substantially a V-shaped cross section corresponding to a corner such as pillars or stairs. Moreover, the curved dent 123c is disposed at a corner portion between the flat sides 123a and 123b and has a shape corresponding to the draining projection 37c. In this embodiment, the flat sides 123a and 123b cross substantially at right angles. An upper mold 115 has a press surface composed of a pair of flat sides 115a and 115b, which form a V-shaped cross section corresponding to the press surface 123a , 123b and 123c of the lower mold 123. The lower mold 123 is movable up and down inside the main mold 111 by a driving unit such as a hydraulic cylinder (not shown).

The accessory tile of the present embodiment is manufactured as follows by using the above mentioned plate tile press machine and the accessory tile press machine.

First, in a colored raw material preparing step A, three kinds of colored crashed and mixed raw materials are prepared from the same crashed and mixed raw material as those of the first embodiment: first colored materials obtained by adding 5% yellow pigment (titan yellow) to the material; second colored material obtained by adding 5% pink pigment (manganese pink) to the material; and the crashed and mixed raw material which has no pigment added. Water is added to each of them and they are granulated into particles of about 70 um diameter, thereby preparing three kinds of colored granules or yellow, pink and uncolored (white) granules.

Then, in the preformed tile body forming step B, as shown in FIG. 7a, the pusher 107c is lowered to a forming position. Then, a rectangular parallelepiped forming space is formed by the side surface of the cavity 105a of the lower mold 103a and the pusher 107c. The size of the forming space is 103 mm wide, 120 mm long and 13 mm deep. Next, two partition plates of semicircular cross section (not shown) are disposed symmetrically in a part corresponding to a part of the preformed tile body 30a except the trimmed part 39, in such a way that tops of the semicirculars are touched to each other. Thus, the partition plates divide the forming space into four spaces (two semicircular spaces and two triangular spaces). A mixture of the uncolored or white granules and the yellow granules is filled in one semicircular space corresponding to the semicircular part 31a (right side in FIG. 7a). A mixture of the uncolored or white granules and the pink granules is filled in the other semicircular space corresponding to the semicircular part 33a (left side in FIG. 7a). The white granules are filled in a space corresponding to the trimmed part 39, which is adjacent to the semicircular space for the semicircular part 31a (right area from a two-dot chain line in FIG. 7a). Also, the white granules are filled in the triangular spaces corresponding to the triangular parts 32a and 34a. Then, the partition plates are removed from the forming space. Thereafter, the colored granules are pressed by lowering the upper mold 101 of the plate tile press machine 100a, thereby forming the preformed main plate body 30a integrally having a colored pattern shown in FIG. 8a and the trimmed part 39. This preformed main plate body 30a has a projection 37a provided on a jointed end portion of a design surface of the semicircular part 33a.

A mixture of the white granules and the pink granules is filled in the forming space of the lower mold 103b which is 103 mm wide, 55 mm long and 13 mm deep. The colored granules are pressed to form the preformed bent plate body 40a. Namely, as shown in FIG. 8b, the pusher 107d is lowered to a forming position. Then, a rectangular parallelepiped forming space is formed by the side surface of the cavity 105b of the lower mold 103b and the pusher 107d. The size is 103 mm wide, 55 mm long and 13 mm deep. Next, a mixture of the white granules and the pink granules is filled in the forming space except a part corresponding to the trimmed part 41. These granules have the same color as the color of the semicircular part 33a. The white granules are filled in the part of the forming space corresponding to the trimmed part 41 (the right area from a two-dot chain line in FIG. 7b). Then, the colored granules are pressed by lowering the upper mold 101 of the plate tile press machine 100b, thereby integrally forming the preformed bent plate body 40a and the trimmed part 41, which have a single pattern as shown in FIG. 8b.

This primary pressure forming works for the preformed tile bodies 30a and 40a, as the preformed tile body forming step B, are performed at a pressure of 100 kg/cm$^2$, respectively. The thickness of each preformed main plate body 30a and the preformed bent plate body 40a after pressing is 10 mm. Here, the pressure is not restricted to the above mentioned value like the first embodiment. If the shapes of the preformed tile bodies 30a and 40a are not damaged in transferring them to the accessory tile press machine after the primary pressure forming work, a lower or higher pressure is admitted, depending on a kind of clay bodies as raw materials or an adhesive such as CMC, or a mixture percentage of the clay body and adhesive.

The preformed tile bodies 30a and 40a have the trimmed parts 39 and 41 of a length of 20 mm provided at their longitudinal ends, respectively. The trimmed parts are unnecessary for the final products and cut off in a following step.

The preformed main plate body 30a and preformed bent plate body 40a are taken out from the forming space by pushing up the pushers 107c and 107d so as to make the preformed tile bodies 30a and 40a exposed from the cavities 105a and 105b.

In the preformed tile body disposing step C, two kinds of preformed tile bodies 30a and 40a obtained in the preformed tile body forming step B are arranged into a shape corresponding to the shape of the finished accessory tile. Namely, as shown in FIG. 9, the lower mold 123 of the accessory tile press machine is lowered to a forming position shown by a solid line in FIG. 9. Then, a forming space, which corresponds to the shape of the accessory tile body, is formed between the press surface 123*a*, 123*b*, 123*c* of the lower mold 123 and the inner surface of the main mold 111. Then, the preformed main plate body 30*a* is disposed on the flat side 123*a* of the press surface, while the preformed bent plate body 40*a* is disposed on the flat side 123*b*. Describing this process more specifically, the preformed main plate body 30*a* is disposed on the one flat side 123*a* of the press surface, while the curved projection 37*a* is placed downward so as to fit in the concave corner or the curved dent 123*c*.

Since the projection 37*a* and the curved dent 123*c* have such curved shapes as fit to each other, the corner end portion of the preformed main plate body 30*a* can be disposed closely on the corner of the press surface of the lower mold 123.

Then, the preformed bent plate body 40*a* is disposed on the other flat side 123*b* of the press surface so that its corner end surface (right in FIG. 9), which is perpendicular to the flat side 123*b*, is placed on the upper surface of the corner end portion of the preformed main plate body 30*a* on the flat side 123*a*. Thus, the preformed tile bodies 30*a* and 40*a* meet at right angles, and the preformed tile bodies 30*a* and 40*a* are closely placed on the press surface 123*a* , 123*b*, 123*c*.

Moreover, the joint end of the preformed bent plate body 40*a*, which is rectangular, can be disposed closely on the upper surface of the joint end of the preformed main plate body 30*a*. Thereby, the preformed main plate body 30*a* and the preformed bent plate body 40*a* are closely joined in an angle shape so that their outer and inner surfaces are continuous without any joint line.

The trimmed parts 35 and 41 of the preformed main plate body 30*a* and the preformed bent plate body 40*a* are oriented toward the outside direction.

The preformed tile bodies 30*a* and 40*a* disposed on the V-shaped press surface 123*a* , 123*b*, 123*c* of the lower mold 123 are shown in FIG. 9.

In the accessory tile forming step D, the upper mold 115 is lowered toward the lower mold 113 on which the preformed tile bodies 30*a* and 40*a* are disposed. Both of the preformed tile bodies 30*a* and 40*a* are pressed between the press surface 123*a* , 123*b*, 123*c* of the lower mold 123 and the press surface 115*a*, 115*b* of the upper mold 115. The preformed tile bodies 30*a* and 40*a* are joined at the joint end or the corner so as to form an angle shaped tile body, as shown in FIG. 9. The tile body is composed of a main plate body element 30*b* made of the preformed main plate body 30*a* and a bent plate body element 40*b* made of the preformed bent plate body 40*a*. Moreover, the outer and inner surfaces of the tile body are completely continuous without any joint line exposed at the corner.

The size of the press surface of the lower mold 123 is as follows. The one part for forming the main plate body 30*b*, which is composed of the flat side 123*a* and the curved dent 123*c*, is 105 mm wide and 123 mm long. The other part for forming the bent plate body 40*b*, which is composed of the flat side 123*b*, is 105 mm wide and 57 mm long. The lowering limit of the lower mold 113 is within 10 mm from the upper end of the inner surface of the main mold 111. The curved dent 123*c* has a curvature and a depth equal to those of the curved projection 37*a*. Therefore, the size of the above mentioned accessory tile forming space is: 105 mm wide, 123 mm long and 10 mm deep for the preformed main plate body 30*a*, and 105 mm wide, 57 mm long and 10 mm deep for the preformed bent body 40*a*. It is noted that the depth of the forming space at the curved dent 123*c* is deeper than the above dimension.

In the accessory tile forming step D of this embodiment, the pressure for the secondary pressure forming work is set at 400 $kg/cm^2$, in consideration of a balance with the primary pressure of 100 $kg/cm^2$ applied in the preformed tile body forming step B. The tile body elements 30*b* and 40*b* have a thickness of 8 mm, after compression, except the part to be the draining projection 37*c*. As in the first embodiment, the pressure is not restricted to the values mentioned above. If the preformed tile bodies 30*a* and 40*a* are completely joined at the corner by the secondary pressure forming work, a lower or higher pressure is admitted, depending on a kind of clay bodies as raw materials or an adhesives such as CMC, or a mixture percentage of the clay body and adhesive, or the primary pressure.

However, in the present embodiment, the pressure difference between them is set larger as that of the first embodiment, since the preformed tile bodies 30*a* and 40*a* are not provided with inclined joint ends of an angle of 45 degrees as in the first embodiment, while having the joint ends thereof crossed at right angles. That is, if the secondary pressure increases up to 400 $kg/cm^2$ accessory tiles become strong enough for practical use. In case of increasing the secondary pressure, it is preferable to enlarge the joint end thickness to prevent the corner of the tile from being broken by pressing. In this embodiment, the thickness is enlarged at the draining projection 37*c*, thereby enlarging the strength thereat at the time of pressing. Moreover, in case the joint end is simply abutted as in this embodiment, the joining area may be small and imbalanced pressure tends to be produced. Therefore, the present embodiment makes up these problems by increasing the secondary pressure and enlarging the thickness at the joint corner. Thus, the pressure balance is kept good and the number of particles rejoined around the joint corner augment, accordingly.

The angle shaped tile body 30*b*, 40*b* formed by the present embodiment is taken out by pulling up the upper mold 115 to separate from the lower mold 123 and pushing up the lower mold 123 to a take-up level so as to move the upper surface of the tile body over the top end of the main mold 111. Such a position is shown by the two-dot chain line in FIG. 9.

Thus produced tile body 30*b*, 40*b* has the trimmed parts 39 and 41 of approximately 20 mm long at the outside ends, which are unneccesary parts as a tile. These trimmed parts 39 and 41 are removed by cutting by a cutter. Since the accessory tile body elements 30*b* and 40*b* are pressed and molded by the sufficient secondary pressure, which is two or more times as large as the primary pressure, it has enough strength to bear any works, such as cutting or fitting of the trimmed parts 39 and 41 by hand, to a sufficient degree, unless it is intended to destroy them.

In the burning step E, the accessory tile bodies obtained in the tile body forming step D are arranged in a chamotte sagger at appropriate intervals therebetween. They are burned four hours at a temperature of 1200° C. and sintered. The thickness of the accessory tile, which is originally about 8 mm, comes into about 7.5 mm after burning, except the draining projection 37*c*. Thus, the finished accessory tile as shown in FIG. 1*b* is obtained.

The accessory tile is obtained Just by abutting and joining the ends of the main plate 30*c* and the bent plate 40*c*, so that the end surface of the main plate 30*c* appears at the corner 35. However, there are no bad influences on the appearance because their continuing parts, the bent plate 40*c* and the semicircular part 33*c* of the main plate 30*c*, have the same color and same pattern. Both the tile body elements 30*b* and 40*b* are formed at a rather high pressure, so that there is no joint line which affects the design effect exposed on the surface of the tile.

The present embodiment of accessory tiles are suitable especially for a kitchen equipment such as a water stopper at a corner of a kitchen table owing to the draining projection 37*c*, or expected to be used in such a field. Specifically, when the accessory tiles are used for the stepped part of stairs or the like, the draining projection 37*c* holds back and conducts any liquids dropped on its surface in an direction away therefrom toward the inside, thereby draining the liquid to a specified place such as a drain ditch or sink. Therefore, it is preferable to use the accessory tile of the present embodiment for tiling around kitchen sinks or the like.

Moreover, the draining projection 37*c* also functions to deflect the pressure direction at the joint part of the preformed tile bodies 30*a* and 40*a*, thereby improving the strength at the joint corner. As a result, the joint force of the accessory tile corner is enlarged, thereby endowing the tile corner with higher quality and reliability.

[THIRD EMBODIMENT]

A third embodiment of the invention will be described referring to FIGS. 10 to 12, taking the accessory tile of FIG. 1*c* as an example.

Figure 1C:
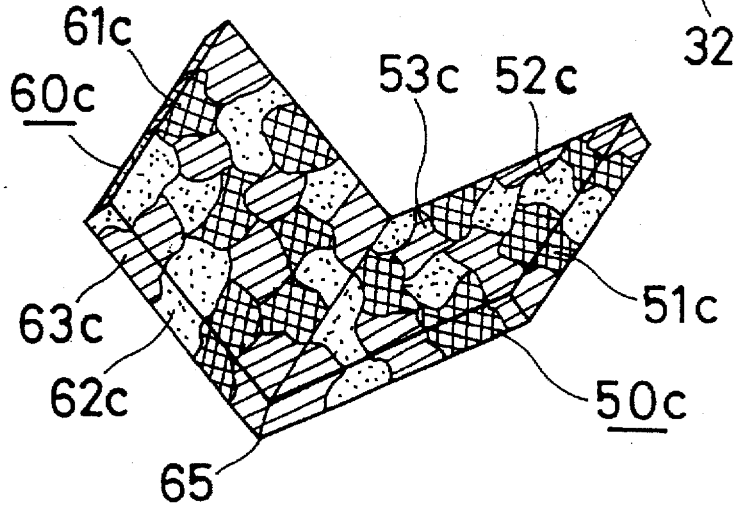

In FIG. 1*c*, an accessory tile has the main plate 50*c* and the bent plate 60*c* at opposite sides of the rectangular corner 65. Each of the main plate 50*c* and the bent plate 60*c* is provided with a spread mottled pattern composed of three colors of parts 51*c*, 52*c*, 53*c*, 61*c*, 62*c* and 63*c*, respectively. The colors are white, blue and dark brown.

This accessory tile is manufactured as mentioned below, according to a manufacturing method similar to that of the first embodiment shown in FIG. 2.

Figure 10:
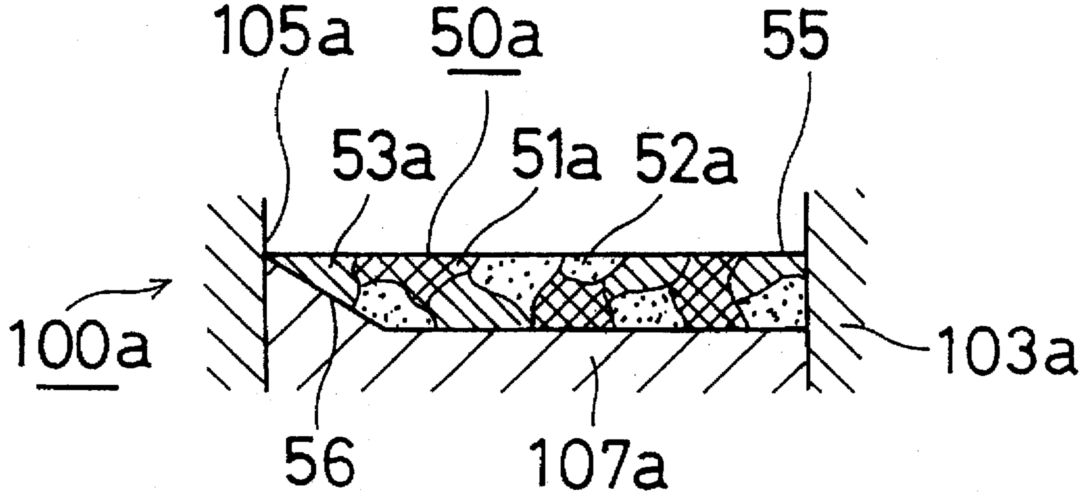
FIG. 10 illustrates a sectional view of a plate tile press machine which is used in a preformed tile body forming step B in a third embodiment of the invention.
Figure 11:
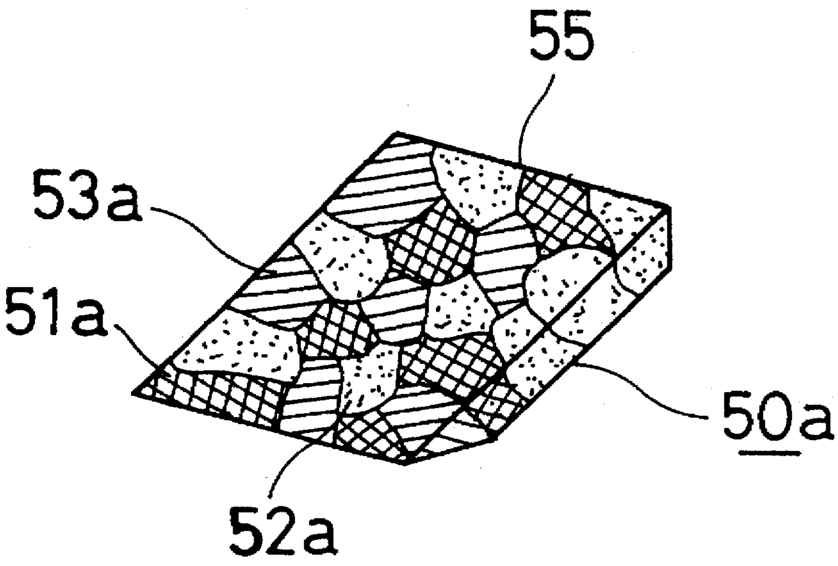
FIG. 11 illustrates a perspective view of a preformed tile body in the third embodiment of the invention.

FIG. 10 illustrates a sectional view of a plate tile press machine which is used in the preformed tile body forming step B in this embodiment. FIG. 11 illustrates a perspective view of a preformed tile body 50*a*. In this embodiment, one plate tile press machine is used for forming preformed tile bodies 50*a* in the same size and shape. The accessory tile is formed by two pieces of preformed tile bodies 50*a* in the same size. One of them is used for forming the long rectangular main plate 50*c* without cutting. The other is used for forming the short rectangular bent plate 60*c* by cutting a long rectangular preformed tile body into a fixed length. The plate tile press machine has the same structure as that used in the first embodiment. The square space, one side of which is 105 mm, is defined between the square cavity 105*a* of the lower mold 103*a* and the pusher 107*a* having an inclined surface at one longitudinal end.

Figure 12:
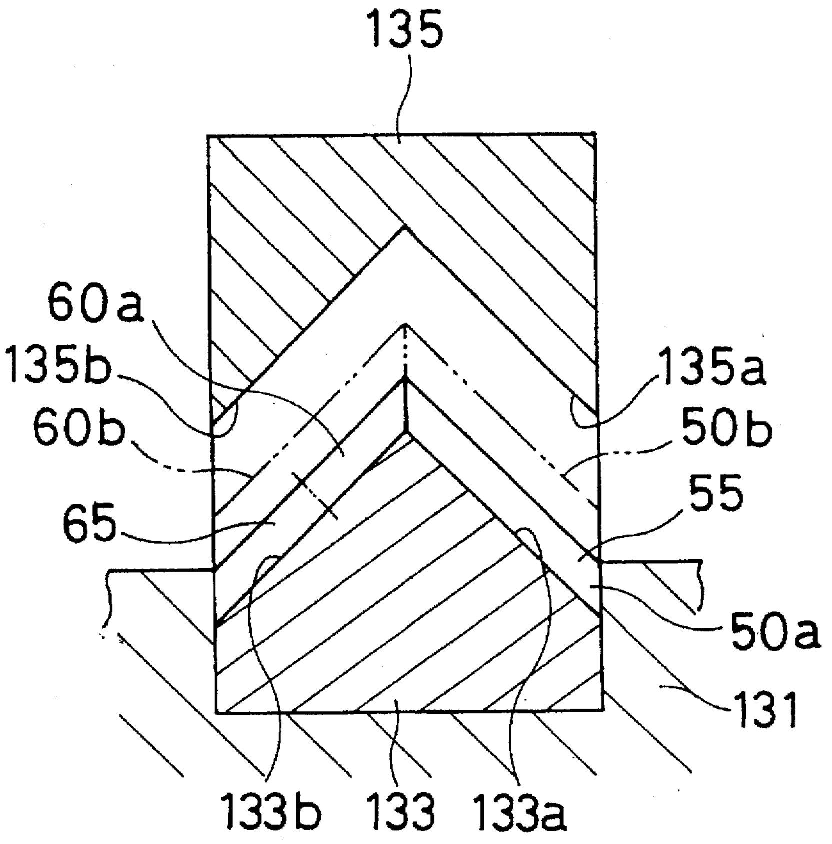
FIG. 12 illustrates a sectional view of an outline of an accessory tile press machine in operating condition which is used in a tile body forming step D in the third embodiment of the invention.

FIG. 12 illustrates a sectional view of an outline of an accessory tile press machine, in operating condition, which is used in the tile body forming step D in this embodiment. The accessory tile press machine has a main mold 131, a lower mold 133 and an upper mold 135. The lower mold 133 has a pressing surface composed of a pair of flat sides 133*a* and 133*b*, which form a cross section of reversed V-shape corresponding to a corner shape of a pillar, a stepped part or stairs or the like. The upper mold 135 has a pressing surface composed of a pair of flat sides 135*a* and 135*b*, which form a cross section of reversed V-shape corresponding to the pressure surface 133*a* , 133*b* of the lower mold 133. The flat sides 133*a* and 133*b* cross with each other at right angles to form a ridge. Also the flat surfaces 135*a* and 135*b* cross with each other at right angles to form a valley. The upper mold 135 is movable up and down so as to adjust an interval to the lower mold 133 by a driving unit such as a hydraulic cylinder and so on. The lower mold 133 is movable up and down inside the main mold 131 by a driving unit such as a hydraulic cylinder and so on(not shown).

A manufacturing method of the present embodiment, which uses the plate tile press machine and the accessory tile press machine, is described below.

To begin with, in a colored raw material preparing step A, a preformed tile body is obtained in the following way.

Three kinds of colored granules (white, dark brown and blue) are prepared by: adding 5% white pigment (a group of $ZrO_2$—$SiO_2$ or zircon), 5% dark brown pigment (a group of $Fe_2O_3$—ZnO) and 5% blue pigment (a group of $ZrO_2$—$SiO_2$—$V_2O_5$ or zircon blue) respectively to three crashed and mixed raw materials similar to those of the first embodiment; further adding water to each of them so that the moisture content becomes 20%; and kneading each of them. The three kinds of colored clay bodies are respectively put into an extruder (not shown). Then, each clay body is extruded from a mouthpiece of 25 mm diameter (not shown), thereby molding white, dark brown and blue bars each of which is 1000 mm long and 25 mm diameter of a circular section. Thereafter, three kinds of colored round bars are gathered and piled in four rows and four lines while arranging the colors at random. Then, the gathered body is vertically cut at 25 mm intervals in the longitudinal direction. The cut pieces are half-dried by air drying at a temperature of not more than 50°. The half-dried cut pieces are disposed in the forming space 105*a* of the lower mold 103*a* of the plate tile press machine 100*a* while their cut surfaces being faced above. Then, they are pressed at a pressure of 50 kg/cm$^2$ thereby forming non-dried body of the preformed tile body 50*a*, 60*a*. At the time of pressing, the cut pieces are deformed and spread, thereby providing the non-dried preformed tile body 50*a*, 60*a* which has a flowing mottled pattern on its surface. The non dried preformed tile body 50*a*, 60*a* is dried at a temperature of 100° C. for hours. In this way, the preformed tile body 50*a*, 60*a* is obtained as shown in FIG. 11. As mentioned above, this preformed tile body 50*a*, 60*a* has an inclined joining surface 56 at the bottom surface of the joining end, corresponding to the slope of the pusher 107*a*.

In this embodiment, two pieces of preformed tile bodies 50*a* and 60*a* which are 105 mm long squares and have the inclined surfaces 56 at an angle of 45 degrees in one end, are used. This is because the patterns on the upper surface and bottom surface of the preformed tile body 50*a*, 60*a* after extruding and cutting are similar. It is not necessary to form the preformed tile bodies for main plate 50*c* and bent plate 60*c* separately. In this embodiment, one accessory tile is formed of two pieces of preformed tile bodies 50*a* in the same size and shape. One of them is used for forming the long rectangular main plate 50*c* without cutting, and the other is used for forming the short rectangular bent plate 60*c* by cut a long one into a fixed length.

As the preformed tile body forming step B, a primary pressure forming work of the preformed tile body 50*a*, 60*a* is carried out at a pressure of 50 kg/cm$^2$, though the pressure is not restricted to this value in practising the invention. If the extruded bars can be surely formed into a desired three dimensional shape, a lower or higher pressure is admitted, depending on a kind of clay bodies as raw materials, an adhesive such as CMC and so on, or a mixture percentage of the clay body and adhesive, etc.

There are provided no trimmed parts on the preformed tile bodies 50*a* and 60*a* in this embodiment.

In a preformed tile body disposing step C, two pieces of preformed tile bodies 50*a* and 60*a* obtained in the preformed tile body forming step B are respectively disposed into an angle shape, corresponding to a shape of a finished accessory tile. As shown in FIG. 12, the lower mold 133 of the accessory tile press machine is lowered to a forming position shown by a solid line in FIG. 12. A forming space, which corresponds to a shape of an accessory tile body, is formed between the press surface 133*a*, 133*b* of the lower mold 133 and the inner surface of the main mold 131. Then, the preformed tile bodies 50*a* and 60*a* are respectively disposed on one flat side 133*a* for the main plate 50*c* and on the other flat side 133*b* for the bent plate 60*c*. Describing this process more specifically, the preformed main plate body 50*a* is disposed on the flat side 133*a* so that an acute edge of the inclined joining surface 56 is placed upward and that an obtuse edge thereof meets with the ridge between the flat sides 133*a* and 133*b*.

Then, the preformed bent plate body 60*a* is disposed on the other flat side 133*b* such that an acute edge of the joining surface 56 is placed upward and that an obtuse edge thereof meets with the ridge. Thereafter, the joining surfaces 56 of the preformed tile bodies 50*a* and 60*a* are joined together. The size of them are equal. Since the preformed tile bodies 50*a* and 60*a* have the sharp edges of an angle of 45 degrees at the joining surfaces 56, the joining areas thereof are equal, too, and both the joining surfaces 56 are closely stuck without any surplus area. When the joining surfaces 56 are contacted closely, the corner of the preformed tile bodies 50*a* and 60*a* around the joining surfaces 56 become perpendicular. Such an angle of the corner corresponds to the corner angle of the ridge, which is also 90 degrees, formed between the flat sides 133*a* and 133*b* of the lower mold 133. Therefore, the preformed tile bodies 50*a* and 60*a* are closely placed on the press surface 133*a*, 133*b*.

Consequently, a pair of preformed tile bodies 50*a* and 60*a* are disposed on the press surface 133*a*, 133*b* of the lower mold 133 as shown in FIG. 12.

In the present embodiment, the bent plate 60*c* is obtained by cutting the preformed tile body 60*a*, because the pattern of the preformed tile body 60*a* is a spread mottled one and it is hard to obtain the same pattern in other shape than the square shape. The cut parts are used for manufacturing another angle tile.

In a tile body forming step D, the upper mold 135 is lowered toward the lower mold 133 on which the preformed tile bodies 50*a* and 60*a* are disposed. Both the preformed tile bodies 50*a* and 60*a* are pressed between the press surfaces 133*a*, 133*b* and 135*a*, 135*b*. Then, the preformed tile bodies 50*a* and 60*a* are joined at the joining surfaces 56, thereby providing an accessory tile body of angle shape. This accessory tile body is dried for a sufficient time at a temperature of not more than 100° C. A main plate body 50*b* is made of the preformed tile body 50*a* as it is. A bent plate body 60*b* is obtained by cutting the preformed tile body 60*a* at right angles by a cutter at a position 50 mm apart from the end of the joint surface 56, corresponding to the length of the bent plate 60*c*, as shown by the two-dot chain line in FIG. 12. Thereafter, an angle shaped tile body, which is composed of a pair of tile body elements 50*b* and 60*b*, is obtained. This tile body has its inner and outer surfaces smooth without any joint line at the corner.

The size of each flat side 133*a* and 133*b* of the lower mold 133 is 107 mm wide and 107 mm long square. The lowering limit of the lower mold 133 is within 15 mm from the upper end of the inner surface of the main mold 111. Therefore, the size of the forming space for each preformed tile body 50*a*, 60*a* is 107 mm wide, 107 mm long and 15 mm deep.

In the tile body forming step D of this embodiment, the pressure of the secondary pressure forming work is set at 300 kg/cm$^2$, in consideration of balance with the primary pressure 50 kg/cm$^2$ in the preformed tile body forming step B. The main plate body 50*b* has a size of 100 mm wide, 100 mm long and 8 mm thick square, and the bent plate body 60*b* has a size of 100 mm wide, 50 mm long and 8 mm thick rectangular. The pressure is not restricted to the above value. If the preformed tile bodies 50*a* and 60*a* are completely joined at the corner by the secondary pressure forming work, a lower or higher pressure is admitted, depending on a kind of clay bodies as raw materials, an adhesive such as CMC and so on, a mixture percentage of the clay body and adhesive, or the primary pressure. The larger the pressure difference between the primary pressure and the secondary pressure is, the stronger the joining force of the preformed tile bodies 50*a* and 60*a* is. Thus, the corner strength of the finished accessory tile is increased.

The accessory tile body 50*b*, 60*b* formed in the above mentioned way is taken out from the forming space by pulling up the upper mold 135 to separate from the lower mold 133 and pushing up the lower mold 133 to a take-up level, thereby moving the upper surface of the tile bodies 50*b* and 60*b* over the top end of the main mold 131, as shown by the two-dot chain line in FIG. 12.

Since the accessory tile body 50*b*, 60*b* is pressed and molded by the primary pressure forming work after forming a plurality of bars by the wet method and by the sufficient secondary pressing force, which is several times as large as the primary pressure, it has enough strength to bear any works by hand to a sufficient degree, unless it is intended to destroy them. The corner of the accessory tile is formed by sticking the joining surface 56, whose surfaces are larger than those of rectangular ends, so that a stronger corner can be obtained.

In a burning step E, the accessory tile bodies obtained in the tile body forming step D are arranged in a chamotte sagger at appropriate intervals therebetween. They are burned four hours at a temperature of 1200° C. and sintered.

Thus obtained tile is shown in FIG. 1*c*. The accessory tile has the main plate 50*c* of 100 mm wide, 100 mm long and 10 mm thick and the bent plate 60*c* of 100 mm wide, 50 mm long and 10 mm thick at opposite sides of the perpendicular corner 65. Each surface of the main plate 50*c* and the bent plate 60*c* has three parts 51*c* and 61*c*, 52*c* and 62*c*, and 53*c* and 63*c* with a spread mottled pattern or three colors, white, blue and dark brown arranged successively.

In this embodiment, the preformed tile bodies are formed by the wet method, so that interval between particles of raw materials becomes closer. Moreover, the primary pressure is set at 50 kg/cm$^2$ and the secondary pressure is set at 300 kg/cm$^2$. As a result, tile bodies have enough strength.

[FOURTH EMBODIMENT]

A fourth embodiment of the inventive accessory tile will be described referring to FIGS. 13*a*, 13*b* and 13*c*.

Figure 13A:
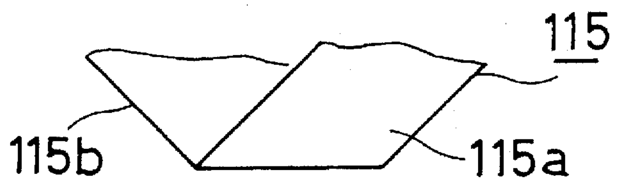
Figure 13B:
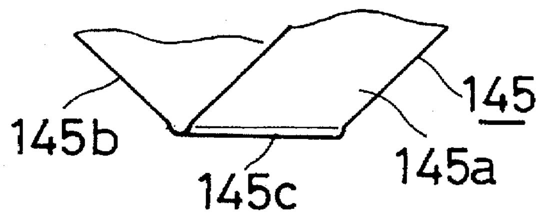
Figure 13C:
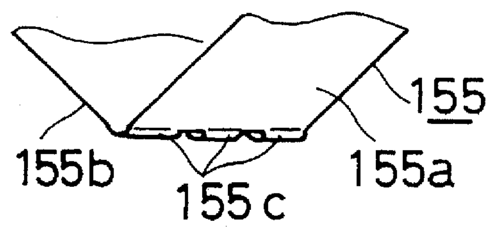

FIGS. 13*a*–13*d* illustrate perspective views, partially cut away, of an upper mold ridge of the accessory tile press machine, respectively. FIG. 13*a* illustrates the upper mold ridge of the accessory tile press machine used in the first and second embodiments. FIG. 13*b* illustrates an upper mold ridge as an example of a first modification. FIG. 13*c* illustrates an upper mold ridge as an example of a second modification.

In FIG. 13*a*, a perpendicular ridge is formed between a pair of flat sides 115*a* and 115*b* as a press surface of the upper mold 115. In FIG. 13*b*, a ridge is formed between a pair of flat sides 145*a* and 145*b* as a press surface of an upper mold 145. The ridge has a pressure assisting projection 145*c* of a semicircular cross-section, which is bulged downward from a perpendicular corner of the mold 145. In FIG. 13*c*, a ridge is formed between a pair of flat sides 155*a* and 155*b* as a pressing surface of an upper mold 155. The ridge has plural pressure assisting projections 155*c* of a semicircular section, which are bulged downward from a perpendicular corner of the mold 155 and aligned along the ridge at a fixed interval.

For instance, if a tile of a standard size of 100 mm wide and not more than 10 mm thick is produced like the above embodiment, the primary pressure of a preformed tile body is set at 100 kg/cm$^2$, and the secondary pressure for forming an accessory tile is set at 400 kg/cm$^2$. Thus, the preformed tile bodies can be joined reliably at the corner along the width direction merely by adjusting the pressures. The same is true of the second embodiment in which the rectangular joining ends are Just abutted and joined. On the other hand, if a larger tile, for example, a larger size over 150 mm long and 20 mm thick is produced, it is possible that an enough pressure cannot be transmitted from the ridge of the upper mold 115 to the jointed corner portion, particularly to both sides of the corner, of the preformed tile bodies, by merely increasing the secondary pressure. Therefore, the above mentioned press assisting projections 145*c* and 155*c* are provided to add a larger pressure to a portion, where a pressure is hard to be transmitted sufficiently, such as both sides of the joint corner of preformed tile bodies, than the rest. In consequence, particle density of the joint corner ie heightened and pressure effect is improved, thereby giving the corner an enough strength.

In this embodiment, the press assisting projection 145*c* or the projections 155*c* should be provided on the ridge of the lower mold 133 in case of the die of FIG. 12. Thus, when a pair of preformed tile bodies are joined by pressing, the press assisting projection 145*c* or projections 155*c* increase the pressure for joining the corner portions of the preformed tile bodies. This structure brings some advantageous effects. Especially, it prevents such troubles as deterioration in strength of the corner of the tile, which could be caused by insufficient joining force at the corner in case it is rather longer. The pressure assisting projection 145*c* or 155*c* transmits more pressure to the inside surface of the accessory tile, without any influences on the outside surface as a design surface, so that no marks due to the additional pressure appear on the design surface. Thus, a good appearance of the design can be kept on the tile, in spite of the additional pressure by the projection 145*c*, 155*c*.

[FIFTH EMBODIMENT]

A fifth embodiment of this invention will be described referring to FIGS. 14 to 16, taking the accessory tile (cap corner tile) shown in FIG. 14 as an example.

Figure 14:
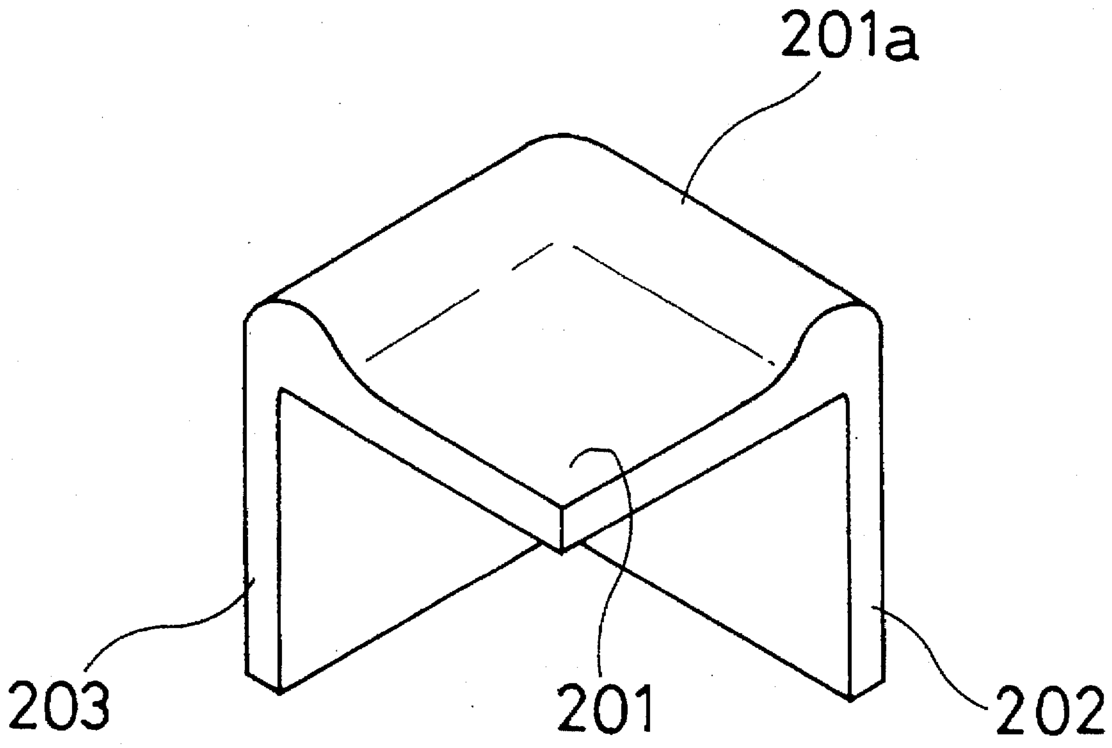
FIG. 14 illustrates a perspective view of an accessory tile in a fifth embodiment of the invention.

FIG. 14 illustrates a perspective view of an accessory tile in the fifth embodiment of this invention.

Three pieces of plate tiles 201, 202 and 203 form an accessory tile shown in FIG. 14, which has such a shape as takes any three faces out of six faces of a hexahedron with other three faces opened. Such a shape of tile is called a corner cap tile. Each plate tile 201, 202, 203 is made by the method described above. A draining projection 201*a* is integrally formed on a joint side corner of an outer top surface, as a design surface, of the plate tile 201. The draining projection 201*a* is similar to that of the second embodiment. The projection 201*a* can drain water or the like from the top surface of the plate tile 201. This accessory tile is manufactured by a process similar to the process shown in FIG. 2, namely, by the secondary pressure forming of the preformed tile bodies obtained in each embodiment, burning them, and so on. Still, the accessory tile of the present embodiment is different from the beforementioned embodiments in that it has the corner cap shape, as mentioned above, composed of three plate tiles 201–203.

Figure 15:
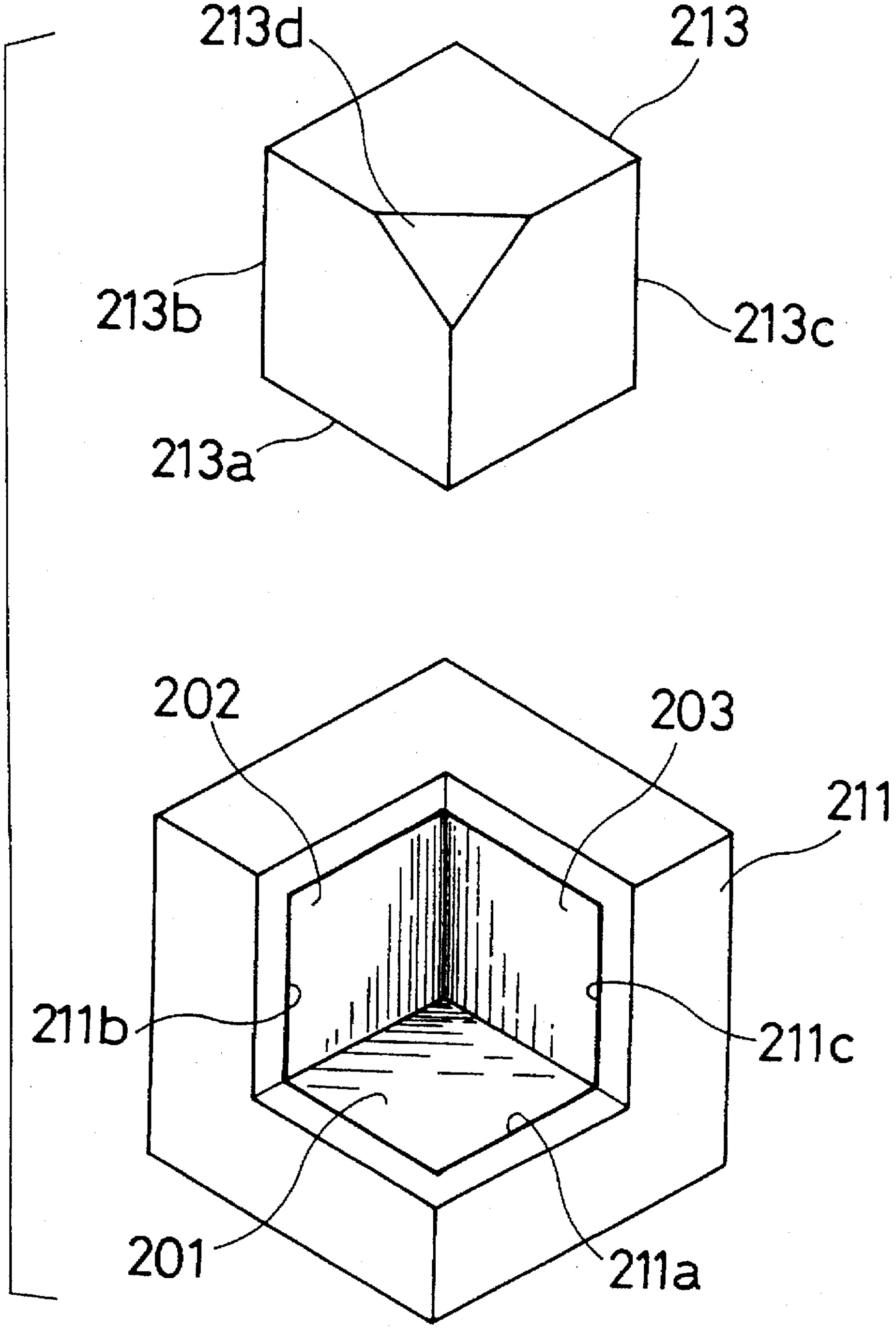
FIG. 15 illustrates a perspective view of an accessory tile press machine which manufactures the accessory tile in the fifth embodiment of the invention.

FIG. 15 illustrates a perspective view of an accessory tile press machine which manufactures the accessory tiles in the fifth embodiment of this invention. FIG. 16 illustrates a sectional view of the accessory tile press machine of FIG. 15.

This accessory tile press machine has a large cubic female die 211 and a small cubic male die 213*a*. The female die has three flat sides 211*a*, 211*b* and 211*c* and a curved dent 211, as a press surface. The press surface 211*a* to 211*d* of the female die 211 defines substantially a cubic concavity corresponding to the outer design surface of the accessory tile, which is composed of three perpendicularly crossing flat surfaces and a bulged surface of the draining projection 201*a*. More specifically, the curved dent 211*d*, as part of the concave press surface 211*d*, is positioned on the inner ends, near the flat sides 211*b* and 211*c*, of the flat side 211*a*. Three flat sides 213*a* to 213*c* of the male die 213 has plane surfaces, respectively, corresponding to an inner surface of the accessory tile, which is composed of three perpendicularly crossing flat surfaces. The male die 213 is movable toward and away from the female die 211, so as to adjust an interval to the female die 211 by a driving unit (not shown). The male die 213 is entirely put into the cubic concavity, composed of the flat sides 211*a*–211*c*, of the female die 211, while having perimeters of the flat sides 213*a*–213*c* closely touched with perimeters of the flat sides 211*a* to 211*c*. The press surface 213*a*–213*c* of the male die 213 and the press surface 211*a*–211*d* of the female die 211 cooperatively define a forming space corresponding to the shape of the accessory tile. An opposite corner of the press surface 213*a*–213*c* of the male die 213 is cut away so as to form a driving side surface 213*d*, which is connected to the above mentioned driving unit.

To manufacture the accessory tile of the present embodiment, first, desired colored raw materials are prepared in a colored raw material preparing step A. Then, preformed tile bodies of plate shapes corresponding to the shapes of the plate tiles 201, 202 and 203, respectively, are formed in a preformed tile body forming step B. In a next preformed tile body disposing step C, the three preformed tile bodies are disposed appropriately on the flat sides 211*a*–211*c* of the female die 211 shown in FIGS. 15 and 16. In a tile body forming step D, the male die 213 is driven closely toward the female die 211. Then, the flat sides 213*a* to 213*c* of the press surface respectively press the corresponding sides of the inner surface of the preformed tile bodies, disposed in the forming space of the female die 211, toward the press surface 211*a*–211*d* of the female die 211 at a predetermined pressure. That is, the preformed tile body go through the primary pressing between the press surfaces 211*a*–211d and 213*a*–213*c*, thereby being formed into the accessory tile body (corner cap body). Thereafter, the tile body is taken out from the female die 211. The accessory tile shown in FIG. 14 is finally obtained by burning the tile body in a burning step E.

Figure 16:
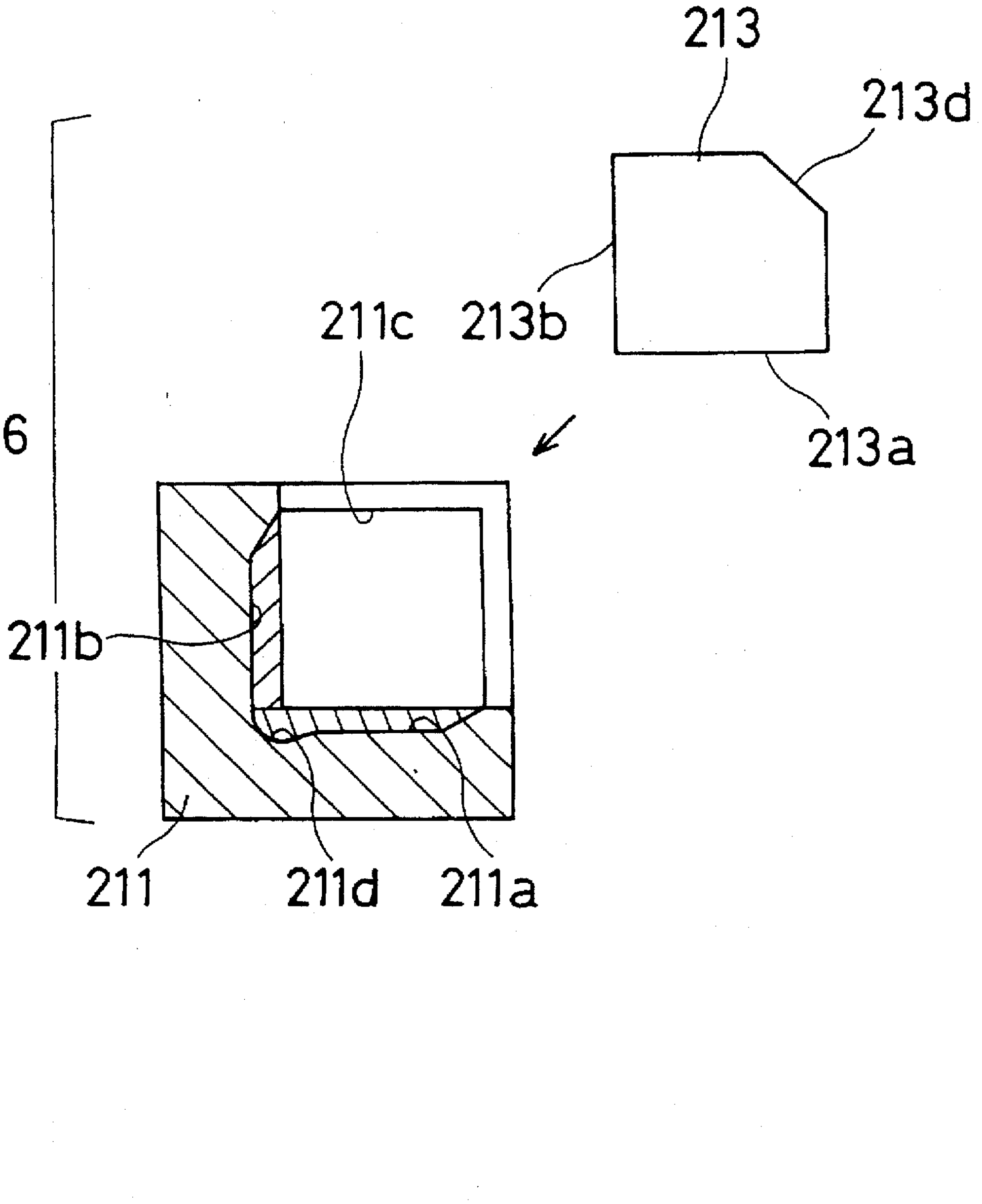
FIG. 16 illustrates a sectional view of the accessory tile press machine which manufactures the accessory tile in the fifth embodiment of the invention.

In the above mentioned tile body forming step D, the female die 211 is preferabaly structured such that it is able to move the press surface 211*a* to 211*d* between an inner forming position shown in FIG. 16 and a take-up position which is set outward from the forming position. If the female die 211 has such a structure, the tile body after the secondary pressure forming can be easily taken out therefrom. Free ends of the tile body are formed aslant, as shown in FIG. 16, in parallel with the moving direction of the press surface 211*a* to 211*d*, until the secondary pressure forming is finished. The free ends of the tile body are cut off by a cutter before the burning step E so as to be rectangular. In the present embodiment, manufacturing conditions or the like in each step follow those in the above embodiments. The preformed tile bodies have their rectangular ends abutted and joined to each other like the second embodiment. Still, they may have inclined ends joined like the first embodiment.

In this embodiment, corner cap tiles as accessory tiles are obtained. These accessory tiles can be used for such corner parts of buildings as both right and left ends of stairs or stepped parts, both rectangular ends of pillars or the like. As a result, tiling work becomes easier even if corner shapes have many variations, and work efficiency can be improved.

[SIXTH EMBODIMENT]

A variety of accessory tiles which can be manufactured by this invention are shown in FIGS. 17*a*–17*g*. These accessory tiles are manufactured in a similar way to that of the above embodiments, as shown in FIG. 2.

Figure 17A:
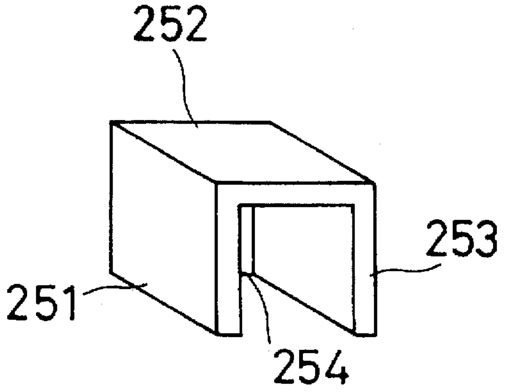
FIG. 17*a* to FIG. 17*g* respectively illustrate front elevational views of various shapes of accessory tiles of a sixth embodiment which can be manufactured in this invention.

An accessory tile of FIG. 17*a* uses four pieces of preformed tile bodies, as primary formed bodies, which is obtained in a similar way to that of the above each embodiment. A forming space, which is defined between upper and lower molds or female and male dies, is made into a shape composed of any four sides of a hexahedron with other two sides opened. These four preformed tile bodies are disposed on corresponding four sides of the press surface of the mold or die, respectively. Then, the preformed tile bodies go through a secondary pressing and are formed into one body by the molds or dies, thereby providing a tile body of a specific shape of the forming space. The tile body is burnt to be made into the accessory tile as a final product.

This example can provide an accessory tile corresponding to corners or longitudinally opposite ends of bars or the like as a building material for tiling, so that tiling becomes easier even if corner or end shapes have many variations, and work efficiency is improved.

Figure 17B:
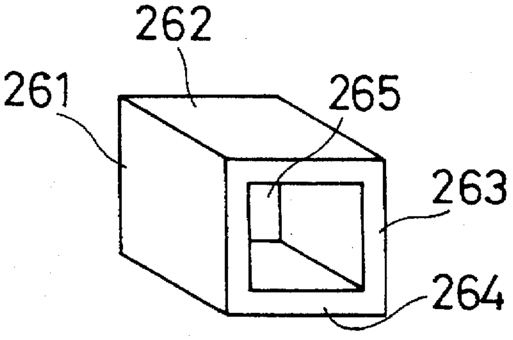

An accessory tile of FIG. 17*b* uses five pieces of preformed tile bodies, as primary formed bodies, which is obtained in a similar way to that of the above each embodiment. A forming space, which is defined between upper and lower molds or female and male dies, is made into a box shape composed of any five sides of a hexahedron with other one side opened. These five preformed tile bodies are disposed on corresponding five sides of the press surface of the mold or die, respectively. Then, the preformed tile bodies go through a secondary pressing and are formed into one body by the molds or dies, thereby providing a tile body of a specific shape of the forming space. The tile body is burnt to be made into the accessory tile as a final product. This accessory tile has a square or rectangular tube with one end opened and the other end closed. Such a tile can be used for tombstones or the like. It can be manufactured easier and faster than conventional tombstones made of common stone materials. Moreover, the accessory tile has less weight, thereby making its handling easier. Furthermore, the production costs can be cut down.

This example can provide an accessory tile corresponding to corners or longitudinally opposite ends of bars or the like as a building material to be tiled, so that the same effects as the above example of FIG. 17*a* are expected.

Figure 17C:
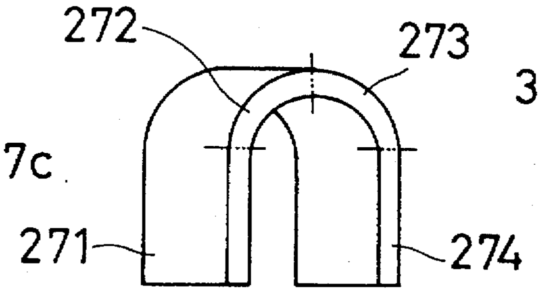

An accessory tile of FIG. 17*c* uses two preformed tile bodies of plate shape and two preformed tile bodies of quarter circular cross section, as primary formed bodies. The plate shaped bodies are obtained in a similar way to that of the above each embodiment. The bodies of quarter circular cross section are made by a press machine, which modifies the forming space of the plate tile press machine of the above embodiments into a quarter circular cross section. The forming space, which is defined between upper and lower molds or female and male dies, is made into a U-shaped cross section. These four preformed tile bodies are disposed on corresponding parts in the forming space of the molds or dies, respectively. Then, the preformed tile bodies go through a secondary pressing and are formed into one body, while joined at portions shown by two-dot chain lines of FIG. 17*c*, thereby providing a tile body of a specific shape of the forming space. The tile body is burnt to be made into the accessory tile as a final product. This accessory tile has a U-shaped cross section.

This example can provide an accessory tile corresponding to corners of a building material to be tiled, such as a chamfered or curved corner or the like, so that the same effects as the above examples of FIG. 17*a* and FIG. 17*b* are expected.

Figure 17D:
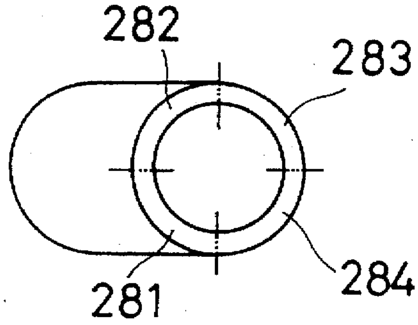

An accessory tile of FIG. 17*d* uses four preformed tile bodies of quarter circular cross section, as primary formed bodies. The preformed tile bodies are made by a press machine, which modifies the forming space of the plate tile press machine of the above embodiments into a quarter circular cross section. The forming space, which is defined between upper and lower molds or female and male dies, is made into a tubular shape. These four preformed tile bodies are disposed in this forming space of the molds or dies. Then, the preformed tile bodies go through a secondary pressing and are formed into one body, while joined at portions shown by two-dot chain lines of FIG. 17*d*, thereby providing a tile body of a round tubular shape of the forming space. The tile body is burnt to be made into the accessory tile as a final product.

This example can provide an accessory tile corresponding to opposite ends of a round bar or the like as a building material to be tiled, so that the same effects as the above examples of FIG. 17*a* to FIG. 17*c* are expected.

Figure 17E:
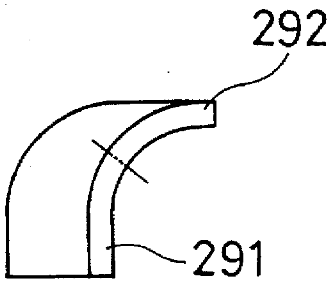

An accessory tile of FIG. 17*e* uses two preformed tile bodies of semi-quarter circular cross section, as primary formed bodies. The preformed tile bodies are made by a press machine, which modifies the forming space of the plate tile press machine of the above embodiments into a semi-quarter circular cross section. The forming space, which is defined between upper and lower molds or female and male dies, is made into a quarter circular cross section. These two preformed tile bodies are disposed in this forming space of the molds or dies. Then, the preformed tile bodies go through a secondary pressing and are formed into one body, while joined at a portion shown by the two-dot chain line of FIG. 17*e*, thereby providing a tile body of a quarter circular cross section of the forming space. The tile body is burnt to be made into the accessory tile as a final product.

Figure 17F:
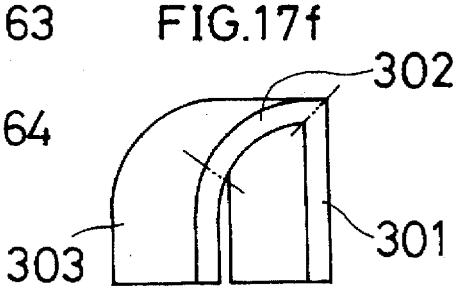

An accessory tile of FIG. 17*f* uses a preformed tile bodies of plate shape and two preformed tile bodies of semi-quarter circular cross section, as primary formed bodies. The plate shaped body is obtained in a similar way to that of the above each embodiment. The bodies of semi-quarter circular cross section are made by a press machine, which modifies the forming space of the plate tile press machine of the above embodiments into a semi-quarter circular cross section. The forming space, which is defined between upper and lower molds or female and male dies, is made into substantially a V-shaped cross section. These three preformed tile bodies are disposed on corresponding parts in the forming space of the molds or dies, respectively. Then, the preformed tile bodies go through a secondary pressing and are formed into one body, while joined at portions shown by two-dot chain lines of FIG. 17*f*, thereby providing a tile body of a specific shape of the forming space. The tile body is burnt to be made into the accessory tile as a final product. This accessory tile has substantially a V-shaped cross section.

Figure 17G:
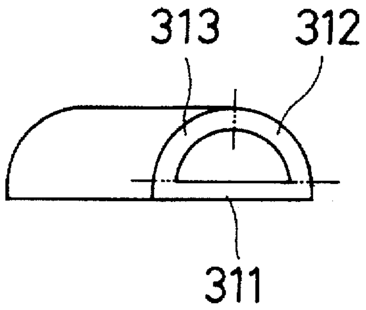

An accessory tile of FIG. 17*g* uses a preformed tile body of plate shape and two preformed tile bodies of quarter circular cross section, as primary formed bodies. The plate shaped body is obtained in a similar way to that of the above each embodiment. The bodies of semi-quarter circular cross section are made by a press machine, which modifies the forming space of the plate tile press machine of the above embodiments into a quarter circular cross section. The forming space, which is defined between upper and lower molds or female and male dies, is made into a semi-circular cross section. These three preformed tile bodies are disposed on corresponding parts in the forming space of the molds or dies, respectively. Then, the preformed tile bodies go through a secondary pressing and are formed into one body, while joined at portions shown by two-dot chain lines of FIG. 17*g*, thereby providing a tile body of a specific shape of the forming space. The tile body is burnt to be made into the accessory tile as a final product. This accessory tile has a semi-circular cross section.

In case of manufacturing the tiles of the examples FIG. 17*a* to FIG. 17*f*, except the example of FIG. 17*e*, it is preferable that the female die for forming an outer surface of the tile is split in plurality, e.g. into pieces devided at the positions shown by the two-dot chain lines of FIGS. 17*c*–17*g*. With this structure, the accessory tiles can be manufactured with more ease, and work efficiency is improved. Moreover, high quality of accessory tiles can be obtained. In case of manufacturing the tiles of the example of FIG. 17*e*, the dies may be split at the position shown by the two-dot chain lines in FIG. 17*e*, or at more positions than these, as desired. As for the tubular shaped accessory tiles shown in the FIGS. 17*b*, 17*d* and 17*g*, a male die for forming an inner surface of the tile is structured such that it can expand in the diameter direction such as rubber pressing die. In this case, the tubular body can be made reliably and accurately, manufacturing efficiency and the quality are improved.

[SEVENTH EMBODIMENT]

Figure 18:
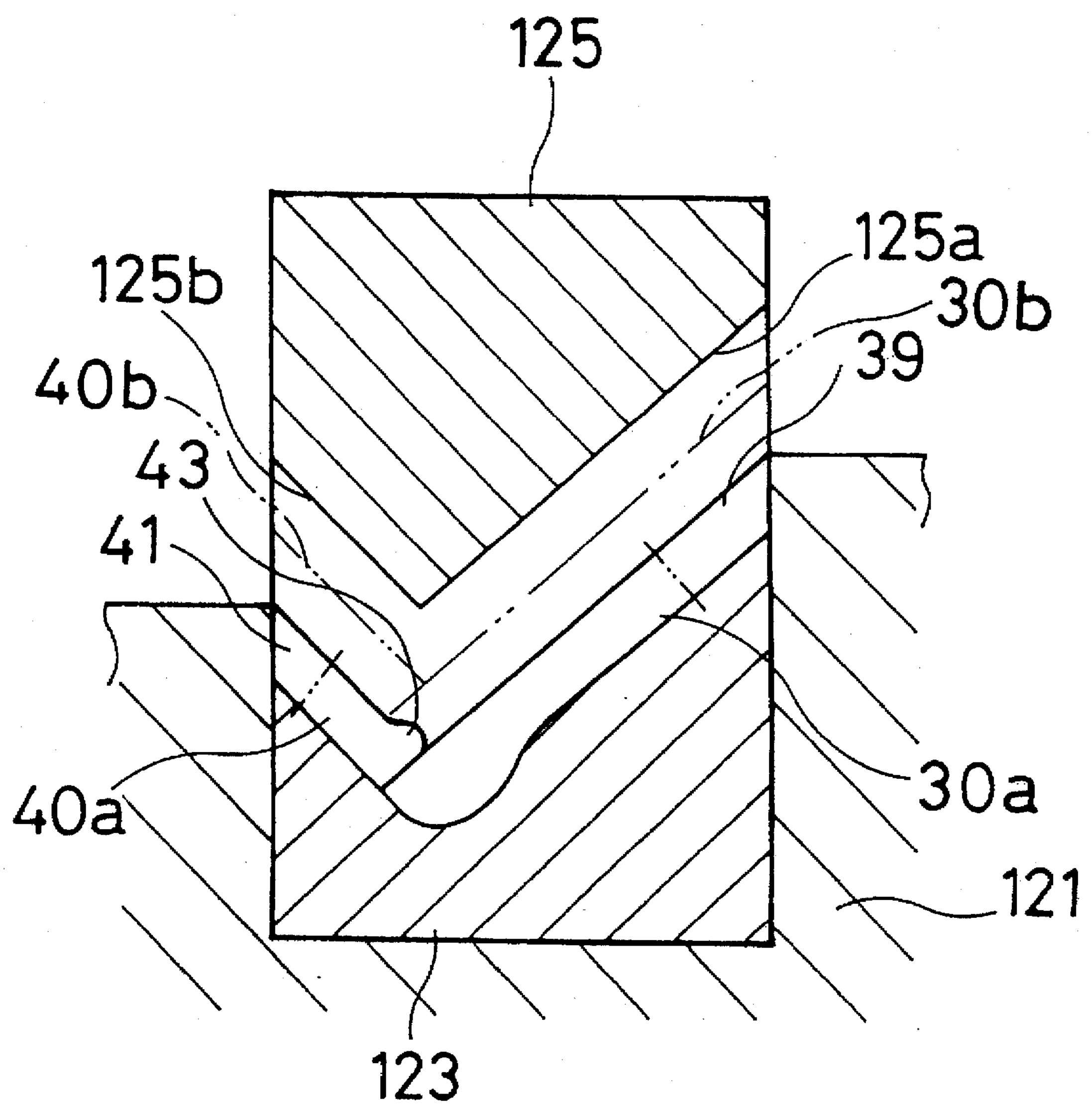
FIG. 18 illustrates a sectional view of an accessory tile for showing its manufacturing method in a seventh embodiment of the invention.

FIG. 18 illustrates a sectional view of an accessory tile and its manufacturing method in this embodiment.

In this embodiment, as shown in FIG. 18, a preformed bent plate body 40*a* has a joint assisting projection 43 of semi-circular cross section bulged in the thickness direction. More specifically, the joint assisting projection 43 is formed at an inner surface of a joint corner of the preformed bent plate body 40*a*, used in the second embodiment, along its width direction. The rest of the structure of the accessory tile is similar to that in the second embodiment.

In this embodiment, since the pressure direction at the joint part of the preformed tile bodies 30*a* and 40*a* is changed to such a direction as crosses with the surfaces at the joined part by the joint assisting projection 43, the joining efficiency by pressing is heightened and the strength of the joint part is increased. Then, the joining strength and the corner strength of the accessory tile is increased, so that it is possible to make the corner of the accessory tile of higher quality and more reliability. The shape of the joint assisting projection 43 is not restricted to the semi-circular cross section, if it is bulged in the thickness direction of the preformed tile body and increases the joining force of the preformed tile bodies.

In this embodiment, the corner ends of the preformed tile bodies 30*a* and 40*a* are simple rectangular shapes, respectively, so as to make it easier to set the end position in the manufacturing process and to prevent damages at the end. In consequence, the production costs can be cut down and high quality products can be obtained. Moreover, since the pressure direction at the joint part of the preformed tile bodies 30*a* and 40*a* is changed by the joint assisting projection 43 at the time of joining in pressure forming, the strength of the joint corner is increased. Then, the corner portion of the accessory tile is given more strength, higher quality and more reliability.

In the above mentioned embodiments, the preformed tile bodies or tile body elements, which are joined at the corner, may be any lengths, including the same length. Moreover, the tile body or the accessory tile as a final product may have a corner of any angles, including curved corner. Moreover, the accessory tile may have any shapes, e.g. a polygonal tube such as a triangular tube, pentagonal tube, hexagonal tube or octagonal tube, a eight figure cross section, etc. Furthermore, the accessory tile may have a bottomed tubular shape, which is made by closing one end of the above shape of tubes. Otherwise, a desired side or a desired part of these shapes may be opened. The accessory tile may be applied to those which are made by joining a plurality of plates or curved tiles. In addition, the size of the final product is not restricted to that described in the above embodiments. Thus, this invention can be used for manufacturing a large plate shape of accessory tile such as a large table or the like.

The manufacturing apparatus used in this invention is not restricted to those described in the above embodiments. Any type of apparatus which has been already used in the ceramic industry can be used as they are, or can be modified to form the above mentioned accessory tiles.

The manufacturing method of the accessory tiles according to the above mentioned embodiments are composed of the colored raw material preparing step A, the preformed tile body forming step B, the preformed tile body disposing step C, the tile body forming step D and the burning step E. The top surface and bottom surface of the accessory tile manufactured by these processes show unique designs, while made by an unglazed natural material. The surfaces is nonskid and may be available for flooring or the like. A grinding step may be added after the burning step E, and at least the design surface of the accessory tile may be ground to exhibit more shine. Since thus ground design surface of the accessory tile gets luster and water repellency similar to those obtained by glazing, it is preferable that the accessory tile is used for the places where not only good design but also waterproofing capacity are required, such as a kitchen, bathroom or the like.

In the grinding step, a conventional multi-stage grinding apparatus (three stages or five stages) may be used so as to give a desired surface roughness to the tile by means of each stage of grinder by making the surface roughness smaller step by step. In this case, the accessory tile has its surface ground usually in a thickness of 1 to 2 mm. Still, since the accessory tile of this invention is made of colored materials, as a predetermined pattern, which go through the tile in all the thickness direction, the predetermined pattern is not lost and good appearance is kept even after the grinding. In addition, in case the accessory tile of this invention is applied to a place where it is used for a time, such as a table, pillar, floor or the like, its surface can be ground to remove dirts on the surface. Thus, the tile restores good appearance and prolongs its life.

While the above embodiment joins the plural preformed tile bodies at their joint ends directly, the present invention may be modified such that a sheet binder or a powder binder is interposed between the joint end surfaces of the preformed tile bodies, as a joining medium, so as to increase the joint force. As the binder, an adhesive such as CMC or the like may be added to raw materials in the above mentioned embodiments. The binder is preferably added in such a thickness, form or amount as is able to be unified and absorbed into the joint part of the preformed tile bodies, as part thereof, in the secondary pressure forming, so that it does not give any change to the appearance of the accessory tile. Moreover, it is enough for the sheet binder to have such a strength as is crushed in the secondary pressure forming. Such a sheet binder is advantageously unified and absorbed into the joint part of the preformed tile bodies, as part thereof, like the powder binder.

In this modified example, an accessory tile can be obtained simply by disposing a pair of preformed tile bodies closely at their ends, joining them and burning. The joining medium facilitates the joining and increases the joint force, so that a stronger corner can be obtained.

The upper mold and lower mold of the above mentioned embodiments can be used vice versa. That is, the word "upper and lower" is for convenience sake, and the upper mold may be used as a lower mold and the lower mold may be used as an upper mold.

The preferred embodiments described herein are therefor illustrative and not restrictive, the scope of the invention being indicated in the appended claims and all variations which come within the meaning of the claims are intended to be embraced therein.

What is claimed is:

1. A method for manufacturing an accessory tile comprising the steps of:

forming a plurality of preformed tile bodies of a clay body, each of the preformed tile bodies being made of substantially the same material, each preformed tile body having a plate shape with a colored pattern provided on its surface, each preformed tile body being unburned so as to be plastic and deformable;

placing the unburned preformed tile bodies on a press surface of a first mold while having first ends of the unburned preformed tile bodies contacted with each other, the press surface of the first mold having a shape corresponding to a shape of a corner portion of a building base material so that the unburned preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the unburned preformed tile bodies between the press surfaces of the first and second molds so as to join the unburned preformed tile bodies at the first ends thereof, thereby obtaining an unburned tile body of a shape corresponding to the shape of the corner portion of the building base material; and burning the unburned tile body.

2. A manufacturing method of an accessory tile according to claim 1, in which the tile body is composed of two preformed tile bodies, the press surface of the first mold is composed of a pair of flat sides crossing angularly, and the tile body is formed into an angle shape.

3. A manufacturing method of an accessory tile according to claim 1, in which the first ends of the preformed tile bodies have inclined surfaces, respectively, and the inclined surfaces are contacted and joined to each other on the press surface of the first mold.

4. A manufacturing method of an accessory tile according to claim 1, in which the first ends of the preformed tile bodies are substantially rectangular, respectively, and contacted and joined to each other at right angles on the press surface of the first mold.

5. A manufacturing method of an accessory tile comprising the steps for:

forming a plurality of preformed tile bodies by pressing a clay body at a first pressure, each preformed tile body having a plate shape with a colored pattern provided on its surface, each preformed tile body being plastic and deformable;

placing each preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds, at a second pressure larger than the first pressure, so as to join the preformed tile bodies at the first ends thereof, thereby obtaining a tile body of a shape corresponding to the shape of the corner portion of the building base material; and burning the tile body.

6. A manufacturing method of an accessory tile according to claim 5, in which the first pressure is not less than 50 $kg/cm^2$.

7. A manufacturing method of an accessory tile according to claim 5, in which the second pressure is approximately two or more times as large as the first pressure.

8. A manufacturing method of an accessory tile according to claim 7, in which the first pressure is not less than 50 $kg/cm^2$.

9. A method for manufacturing an accessory tile in which a tile body is composed of three preformed tile bodies comprising the steps of:

forming three preformed tile bodies of a clay body, each preformed tile body having a plate shape with a colored pattern provided on its surface, each preformed tile body being plastic and deformable;

placing said preformed tile bodies on a press surface of a first mold while having first ends of the preformed tile bodies contacted with each other, the press surface of the first mold being composed of three flat sides selected from six sides of a hexahedron and having a shape corresponding to a shape of a corner portion of a building base material so that the preformed tile bodies placed on the press surface have a shape corresponding to the shape of the corner portion, and the tile body being formed into a shape composed of three flat sides selected from six sides of a hexahedron with three other sides opened;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

10. A method for manufacturing an accessory tile in which a tile body is composed of four preformed tile bodies comprising the steps of:

forming four preformed tile bodies of a clay body, each preformed tile body having a plate shape with a colored pattern provided on its surface, each preformed tile body being plastic and deformable;

placing said preformed tile bodies on a press surface of a first mold while having first ends of the preformed tile bodies contacted with each other, the press surface of the first mold being composed of four flat sides selected from six sides of a hexahedron and having a shape corresponding to a shape of a corner portion of a building base material so that the preformed tile bodies placed on the press surface have a shape corresponding to the shape of the corner portion, and the tile body being formed into a shape composed of four flat sides selected from six sides of a hexahedron with two other sides opened;

moving a press surface of a second mold toward the press surface of the first mold, the press surface of the second mold having a shape corresponding to the shape of the press surface of first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

11. A method for manufacturing an accessory tile in which a tile body is composed of five preformed tile bodies comprising the steps of:

forming five preformed tile bodies of a clay body, each preformed tile body having a plate shape with a colored pattern provided on its surface, each preformed tile body being plastic and deformable;

placing said preformed tile bodies on a press surface of a first mold while having first ends of the preformed tile bodies contacted with each other, the press surface of the first mold being composed of five flat sides selected from six sides of a hexahedron and having a shape corresponding to a shape of a corner portion of a building base material so that the preformed tile bodies placed on the press surface have a shape corresponding to the shape of the corner portion, and the tile body being formed into a shape composed of five flat sides selected from six sides of a hexahedron with one other side opened;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

12. A method for manufacturing an accessory tile in which a tile body has an are cross section comprising the steps of:

forming a plurality of preformed tile bodies of a clay body, a preformed tile body having a plate shape with a colored pattern provided on its surface and two preformed tile bodies of quarter circular cross-section with a colored pattern provided on its surface, each preformed tile body being plastic and deformable;

placing the preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

13. A method for manufacturing an accessory tile in which a tile body has a cylindrical shape comprising the steps of:

forming a plurality of preformed tile bodies of a clay body, each preformed tile body of quarter circular cross-section with a colored pattern provided on its surface, each preformed tile body being plastic and deformable;

placing the preformed tile bodies on a press surface of a first mold while having first ends of the preformed tile bodies contacted with each other, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

14. A method for manufacturing an accessory tile in comprising the steps of:

forming a plurality of preformed tile bodies of a clay body, each preformed tile body having a plate shape with a colored pattern provided on its surface, each preformed tile body being plastic and deformable;

placing the preformed tile bodies on a press surface of a first mold while having first ends of the preformed tile bodies contacted with each other, the first ends of the preformed tile bodies having inclined surfaces, respectively, the inclined surfaces contacted and joined to each other on the press surface of the first mold, the press surface of the first mold having a shape corresponding to a shape of a corner portion of a building base material so that the preformed tile bodies placed on the press surface have a shape corresponding to the shape of the corner portion, and the first end of one of the preformed tile bodies having a draining projection extending longitudinally on an exterior side thereof;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

15. A method for manufacturing an accessory tile in comprising the steps of:

forming a plurality of preformed tile bodies of a clay body, each preformed tile body having a plate shape with a colored pattern provided on its surface, each preformed tile body being plastic and deformable;

placing the preformed tile bodies on a press surface of a first mold while having first ends of the preformed tile bodies contacted with each other, the first ends of the preformed tile bodies having inclined surfaces, respectively, the inclined surfaces contacted and joined to each other on the press surface of the first mold, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material, and wherein one of the first and second molds presses an exterior side of the tile body and the other of the first and second molds presses an interior side of the tile body, and the other of the first and second molds has a press assisting projection at an edge thereof, the press assisting projection protruding in such a direction as to divide an angle of the edge substantially into two; and burning the tile body.

16. A method for manufacturing an accessory tile comprising the steps of:

forming a plurality of preformed tile bodies of a clay body, each preformed tile body having a plate shape with a colored pattern provided on its surface, each preformed tile body being plastic and deformable;

placing the preformed tile bodies on a press surface of a first mold while having first ends of the preformed tile bodies contacted with each other, the first ends of the preformed tile bodies being substantially rectangular, respectively, and contacted and joined to each other at right angles on the press surface of the first mold, one of the first ends of the preformed tile bodies having a joint assisting projection protruding along its length at an interior side thereof, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

17. A method for manufacturing an accessory tile comprising the steps of:

forming a plurality of preformed tile bodies of a clay body, each preformed tile body having a plate shape with a colored pattern provided on its surface, each preformed tile body being plastic and deformable;

placing the preformed tile bodies on a press surface of a first mold while having first ends of the preformed tile bodies contacted with each other, the first ends of the preformed tile bodies being substantially rectangular, respectively, and contacted and joined to each other at right angles on the press surface of the first mold, the first end of one of the preformed tile bodies having a draining projection extending longitudinally on an exterior side thereof, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material; and burning the tile body.

18. A method for manufacturing an accessory tile comprising the steps of:

forming a plurality of preformed tile bodies of a clay body, each preformed tile body having a plate shape with a colored pattern provided on its surface, each preformed tile body being plastic and deformable;

placing the preformed tile bodies on a press surface of a first mold while having first ends of the preformed tile bodies contacted with each other, the first ends of the preformed tile bodies being substantially rectangular, respectively, and contacted and joined to each other at right angles on the press surface of the first mold, the press surface of the first mold having a shape corresponding to a shape of a corner portion of a building base material so that the preformed tile bodies placed on the press surface have a shape corresponding to the shape of the corner portion;

moving a press surface of a second mold toward the press surface of the first mold, the press surface of the second mold having a shape corresponding to the shape of the press surface of the first mold;

pressing the preformed tile bodies between the press surfaces of the first and second molds so as to join the preformed tile bodies at the first ends thereof, thereby obtaining a tile body of a shape corresponding to the shape of the corner portion of the building base material, and wherein one of the first and second molds presses an exterior side of the tile body and the other of the first and second molds presses an interior side of the tile body, and the other of the first and second molds has a press assisting projection at an edge thereof, the press assisting projection protruding in such a direction as to divide an angle of the edge substantially into two; and burning the tile body.

19. A method for manufacturing an accessory tile comprising the steps of:

forming a plurality of preformed tile bodies of a clay body, each of the preformed tile bodies being made of substantially the same material, each preformed tile body having a plate shape with a colored pattern provided on its surface, each preformed tile body being unburned so as to be plastic and deformable;

placing the unburned preformed tile bodies on a press surface of a first mold while having ends of the unburned preformed tile bodies positioned adjacent to each other, the press surface of the first mold having a shape corresponding to a shape of a corner portion of a building base material so that the unburned preformed tile bodies placed on the press surface have a shape corresponding to the shape of the corner portion;

interposing a joining medium between the ends of the unburned preformed tile bodies, the joining medium being made of the same material as the material of the preformed tile body and an adhesive added thereto;

moving a press surface of a second mold toward the press surface of the first mold, the press surface of the second mold having a shape corresponding to the shape of the press surface of the first mold;

pressing the unburned preformed tile bodies between the press surfaces of the first and second molds so as to join the unburned preformed tile bodies at the ends thereof, the joining medium being unified and absorbed into the ends of the unburned preformed tile bodies as part thereof at the time of pressing so that the adjacent ends of the unburned preformed tile bodies are substantially contacted in joining with each other, thereby obtaining a an unburned tile body of a shape corresponding to the shape of the corner portion of the building base material; and burning the unburned tile body.

20. The manufacturing method according to claim 19 wherein said step of interposing a joining medium includes interposing a powder binder between the ends of the preformed tile bodies with sufficient quantity and thickness such that said powder binder is unified and absorbed into the ends of the preformed tile bodies as part thereof during said pressing step.

21. The manufacturing method according to claim 19 wherein said step of interposing a joining medium includes interposing a sheet binder between the ends of the preformed tile bodies, said sheet binder having sufficient strength to be crushed, and unified and absorbed into the ends of the preformed tile bodies as part thereof during said pressing step.

* * * * *